United States Patent [19]
Michelson

[11] Patent Number: 6,082,671
[45] Date of Patent: Jul. 4, 2000

[54] ENTOMOPTER AND METHOD FOR USING SAME

[75] Inventor: Robert C. Michelson, Woodstock, Ga.

[73] Assignee: Georgia Tech Research Corporation, Atlanta, Ga.

[21] Appl. No.: 09/062,114

[22] Filed: Apr. 17, 1998

Related U.S. Application Data

[60] Provisional application No. 60/044,742, Apr. 18, 1997.

[51] Int. Cl.⁷ .................................................. B64C 33/02
[52] U.S. Cl. ................ 244/72; 249/11; 249/22; 249/50
[58] Field of Search .................. 244/11, 22, 72, 244/207, 53 R, 50, 100 R, 2, 64

[56] References Cited

U.S. PATENT DOCUMENTS

| | | | |
|---|---|---|---|
| 1,822,063 | 9/1931 | Schulman | 244/72 |
| 4,139,171 | 2/1979 | Harris | 244/22 |
| 4,712,749 | 12/1987 | Fox | 244/72 |
| 5,836,541 | 11/1998 | Pham | 244/2 |

FOREIGN PATENT DOCUMENTS

| | | | |
|---|---|---|---|
| 1275872 | 8/1968 | Germany | 244/22 |
| 1523902 | 9/1978 | United Kingdom | 244/72 |

OTHER PUBLICATIONS

Houghton, THe origin of lift forces in fluttering flight, Bulletin of Mathematical Biophysics, vol. 28, 1966.

Osborne, Aerodynamics of Flapping flight with Application to Insects, Naval Research Lab., Nov. 6, 1950.

*Primary Examiner*—Galen L. Barefoot
*Attorney, Agent, or Firm*—Thomas, Kayden Horstemeyer & Risley, L.L.P.

[57] ABSTRACT

The present invention is an apparatus and method for a multimodal electromechanical insect known as an entomopter. The entomopter is a species of micro air vehicle (MAV), which is defined as a flying vehicle having no dimension greater than 15 cm. The entomopter mimics the flight characteristics of an insect by flapping wings to generate lift. The entomopter's wings are powered by a reciprocating power source. The same power source may be used to power legs to enable the entomopter to crawl along the ground. In a preferred embodiment, the power source is a compact noncombustive engine known as a reciprocating chemical muscle (RCM).

29 Claims, 18 Drawing Sheets

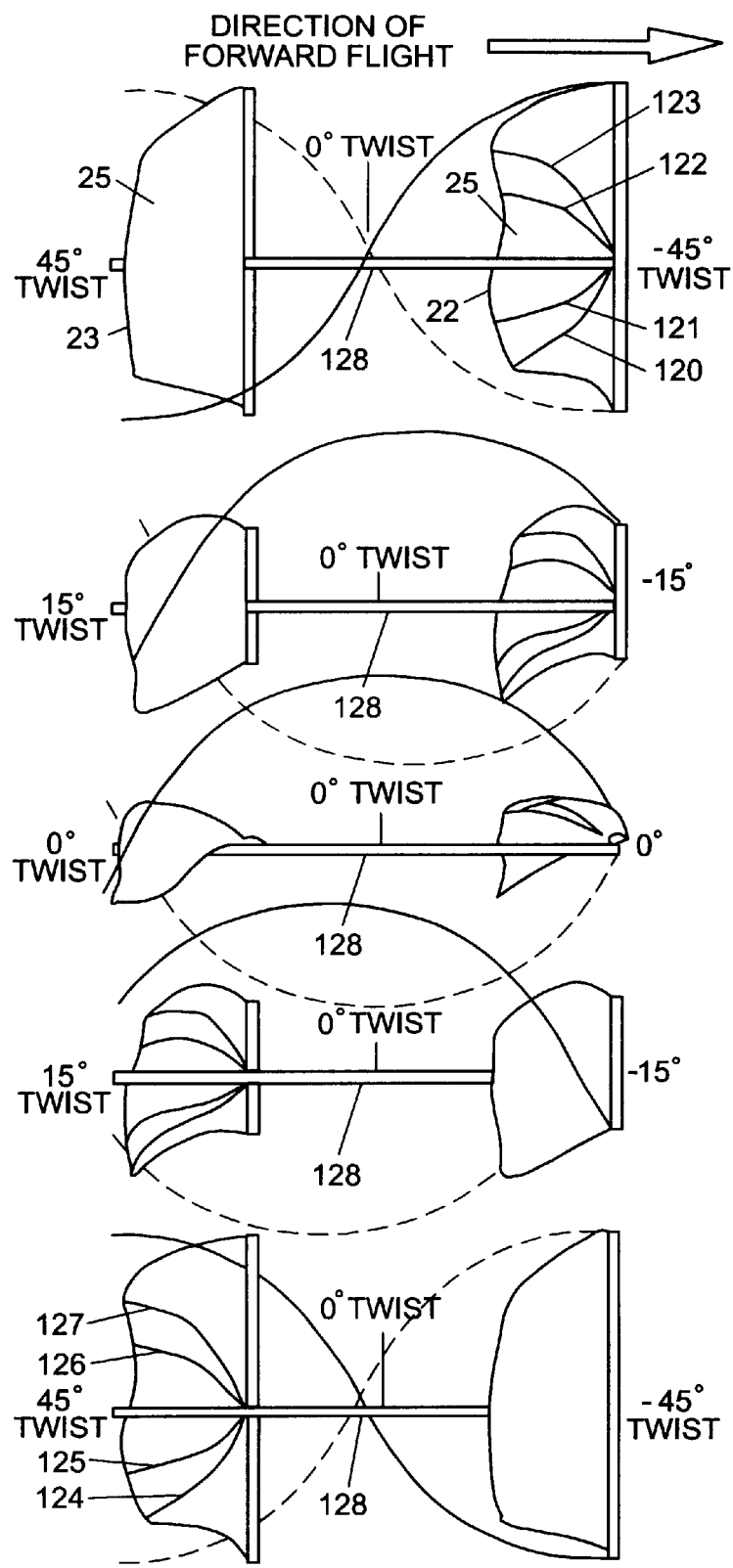
Fig. 2D₁

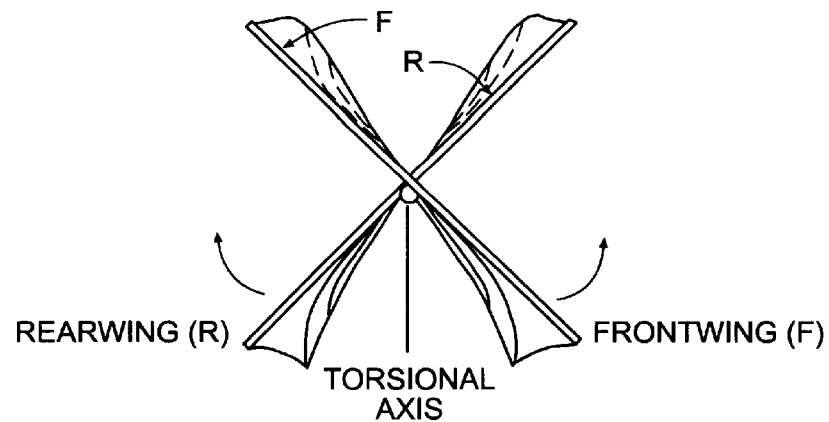
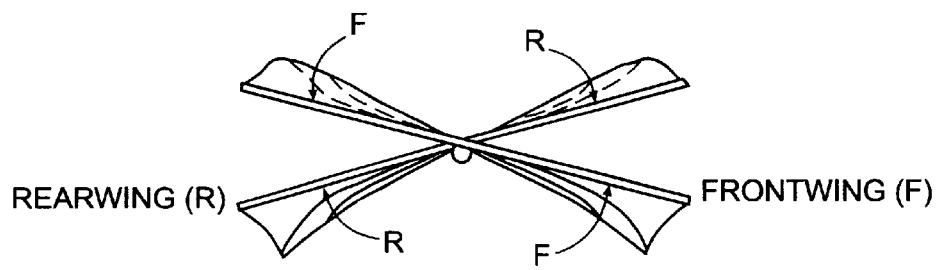
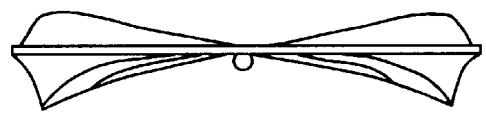
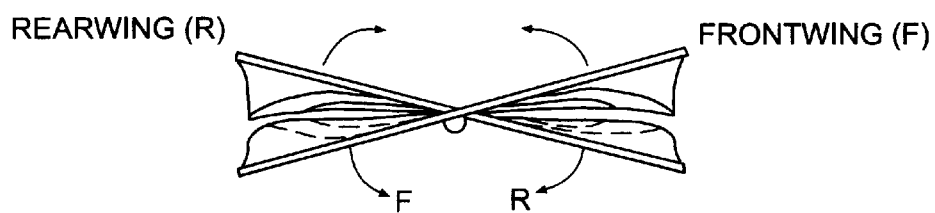
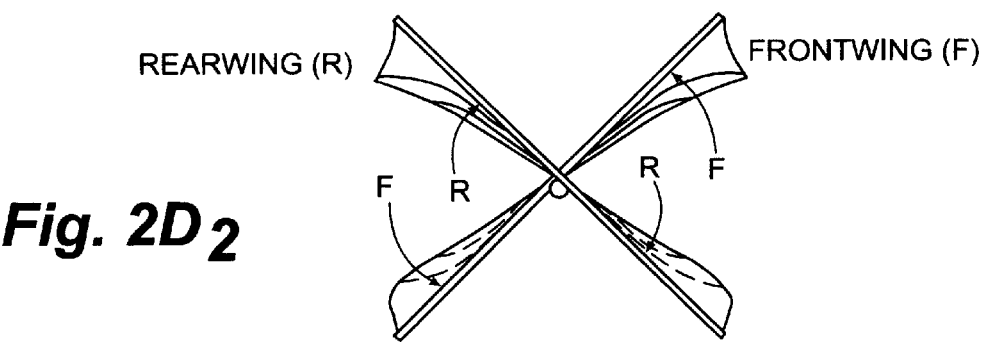
Fig. 2D₂

FRONT VIEW

GUIDE BUSHING POSITION (P1-P3) CORRESPOND TO RIGHT TORQUE ARM POSITION (T1-T3), AND LEFT TORQUE ARM POSITION (S3-S1), RESPECTIVELY

BOTTOM VIEW

DIRECTION OF FORWARD MOTION →

(FOUR LEGGED IMPLEMENTATION)
SIDE VIEW

LEGS DISENGAGED DURING FLIGHT

ENTOMOPTER AND METHOD FOR USING SAME

CROSS REFERENCE TO RELATED APPLICATIONS

The present application claims priority to and the benefit of the filing date of Provisional Patent Application Ser. No. 60/044,742 filed Apr. 18, 1997, entitled "Entomopter," which, in its entirety, is hereby incorporated by reference in this application. The present application is also related to copending application entitled "Reciprocating Chemical Muscle (RCM) and Method for Using Same", filed on Apr. 17, 1998, under express mail No. EL015419712US.

FIELD OF THE INVENTION

The present invention generally relates to the field of flying devices, and in particular to an electromechanical insect, known as an entomopter, that is capable of multimodal locomotion.

BACKGROUND OF THE INVENTION

Existing unmanned aerial vehicles (UAVs) have been successfully tested and utilized for outdoor aerial reconnaissance missions. Experiments have shown on numerous occasions, including operations such as Desert Storm, that UAVs often go unnoticed when flying at several thousand feet over their targets. The state of the art in optics is such that high resolution video and infrared images can be gathered unobtrusively from existing platforms.

There is a similar need for UAVs that are capable of performing indoor reconnaissance missions. Of necessity, a UAV capable of performing such missions must be small enough and slow enough to fly through constricted building interiors. The requirements for a UAV to successfully perform indoor reconnaissance may include such capabilities as rapidly negotiating hallways, crawling under doors, or navigating ventilation systems in an attempt to quickly penetrate deep into a building to complete the mission. Micro air vehicles (MAVs) have been proposed to fulfill such mission requirements. MAVs are generally thought of as miniature flying machines having no dimension greater than approximately 15 cm.

Typically, MAV efforts and proposals have been directed toward fixed wing vehicles. Fixed wing aircraft generally use their forward speed to generate the lift necessary to sustain flight. However, high speed is not conducive to indoor operations because it results in reduced reaction time, especially when autonomously navigating through unknown corridors or amid obstacles. To achieve slow speed flight, fixed wing aircraft require either large wings or a method for creating circulation over the wings in the absence of fuselage translation. Fixed wing aircraft are also generally incapable of vertical takeoffs and landings.

If the wings are enlarged to decrease wing loading to accommodate slower flight, the vehicle soon loses its distinction as a "micro" air vehicle and would be ill suited for indoor operations. If a fixed wing aircraft is maintained at the scale defined for a MAV, the forward speed required for the fixed wing vehicle to stay aloft efficiently violates the criteria for negotiating constricted spaces.

There are methods for creating circulation over the wings with little or no fuselage translation. This can be done by "blowing" the surfaces of the wings to increase lift in an intelligent manner by using an internally-generated pressure source. This has been demonstrated in manned aircraft and certain experimental unmanned vehicles, but is typically inefficient unless there is a source of gas pressure already available (such as bleed air from a gas turbine engine).

Another way to move air over a wing with little or no fuselage translation is to move the wing relative to the fuselage and the surrounding air. This can be a circular motion as in a helicopter rotor. While rotary wing flying MAVs are superior to fixed wing solutions in that they may takeoff and land vertically, they tend to be mechanically complex and energy inefficient.

A rotor is mechanically simple to spin, but does not use all parts of the wing (rotor) with the same efficiency since the inner section near the rotor hub moves more slowly than the tip. As the diameter of a rotor system decreases with the size of the air vehicle design, it becomes less efficient since the velocity at the tips decreases for a given rotational frequency while the useless center portion becomes a larger percentage of the entire rotor disk. To compensate for this, the designer will tend to increase the rotation frequency of the rotor to maintain lift for a given fuselage mass and power source. The increased rotation frequency will not only increase stress in the rotating components, it will increase the frequency and energy content of the sound produced, which will tend to make the craft too noisy for covert indoor reconnaissance.

Fixed wing and rotary wing flying MAVs are likewise not suited for movement through small openings such as partially-opened doors or under closed doors. Similar problems exist for small openings like windows, air vents, and pipes.

Therefore, there is a need for a MAV that is conducive to quiet operation, slow flight, hovering, and vertical takeoff and landing. There is likewise a need for a multimodal MAV having the additional capability of ground locomotion.

SUMMARY OF THE INVENTION

As will be explained more fully hereinafter, the present invention overcomes the inadequacies and deficiencies of the prior art as noted above and as generally known in the industry. This is accomplished by providing, in one embodiment of the invention, an autonomous insect-like robotic vehicle with flapping wings. Another embodiment of the invention provides a multimodal insect-like robotic vehicle with flapping wings as well as legs for ground locomotion.

Nothing in nature exhibits fixed wing flight behavior or propeller-driven thrust. Everything that maintains sustained flight uses flapping wings. Even though there has been considerable analysis in the literature of mechanisms for bird flight and insect flight—and ornithopter-based (bird flight) machines have been demonstrated—there have been no man-made devices that approximate the size and flight characteristics of an insect.

The present invention is an electromechanical insect called an "entomopter" (GK: en, in +temnein, to cut (in ref. to an insect's segmented body)+pteron, wing—"insect wing"). In one embodiment of the invention, the entomopter is a flapping wing MAV having an autonomic wing beat. In another embodiment of the invention, the entomopter is a flapping wing MAV having an autonomic wing beat that also has autonomically moving legs designed for ground locomotion.

The numerous objects, features, and advantages of the present invention will become apparent to one with skill in the art upon examination of the drawings and the following detailed description. Any and all additional objects, features and advantages which may become apparent are intended to be included herein within this disclosure.

BRIEF DESCRIPTION OF THE DRAWINGS

FIGS. 2A–2D are schematic diagrams of the wing configuration and wing flapping characteristics of a second embodiment of an entomopter in accordance with the present invention.

DETAILED DESCRIPTION OF THE PREFERRED EMBODIMENTS

Figure 1:
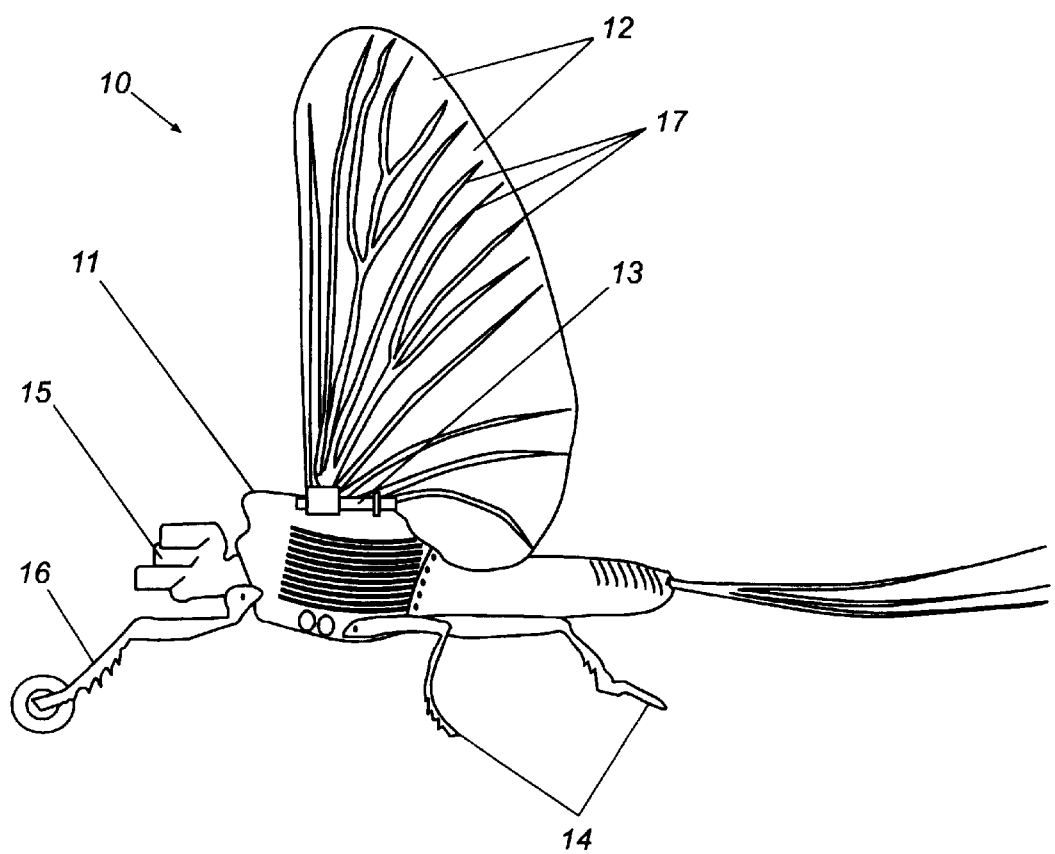
FIG. 1 is a schematic diagram of a first embodiment of an entomopter in accordance with the present invention.

With reference now to the drawings wherein like reference numerals designate corresponding parts throughout the several views, FIG. 1 illustrates a first embodiment of an entomopter 10 in accordance with the present invention. FIG. 1 depicts an entomopter with a morphology similar to that of a Mayfly. However, an entomopter in accordance with the present invention may be modeled on other insects as well. In keeping with the design criteria of a MAV, the size of the entomopter is limited to having no dimension (e.g., length, height width, etc.) greater than approximately 15 cm.

The entomopter 10 of FIG. 1 has a fuselage 11; a pair of opposing wings 12 pivotally coupled to the fuselage; and a controllable flapping means 13 coupled to the wings 12. The controllable flapping means 13 can be any type of power source capable of generating sufficient power to flap the wings 12 and small enough to be mounted on, incorporated into, or totally comprise the fuselage 11 of the entomopter 10. The power source can be a combustive, rheological, chemically reactive, electromotive, electrostrictive, piezoelectric, magnetostrictive, or other suitable power source. In a preferred embodiment, the power source for the controllable flapping means 13 is a reciprocating chemical muscle (RCM), which is described in greater detail below. FIG. 1 also depicts certain optional features of an entomopter, such as surface locomotors 14, sensors 15 for looking forward, down and to the side, and a surface steering mechanism 16. In this embodiment, the wings 12 are coupled to the power source through a structure that can be resonantly excited by the power source. The wings 12 can beat with equal force, stroke, and frequency, or can be differential in either force, stroke, or frequency. In the preferred embodiment, equal force, stroke, and frequency are maintained under all flight conditions, with changes in individual wing lift being periodically modified by venting gas produced by the RCM from slots 17 along the surface of the wings. This technique of lift modification, commonly termed "circulation control", can either enhance or spoil lift by causing the flow over the wing to remain attached to the surface of the wing longer than would naturally occur thereby increasing lift, or by disrupting leading edge vortices that naturally propagate along the surface of a flapping wing, thereby decreasing lift. Application of increased or decreased lift on one wing will cause an "aileron effect" which will steer the entomopter to the right or left during flight. Increasing or decreasing the flapping frequency, or applying circulation control to both wings simultaneously, will cause the entomopter to climb or descend.

Figures 2A, 2B, 2C:
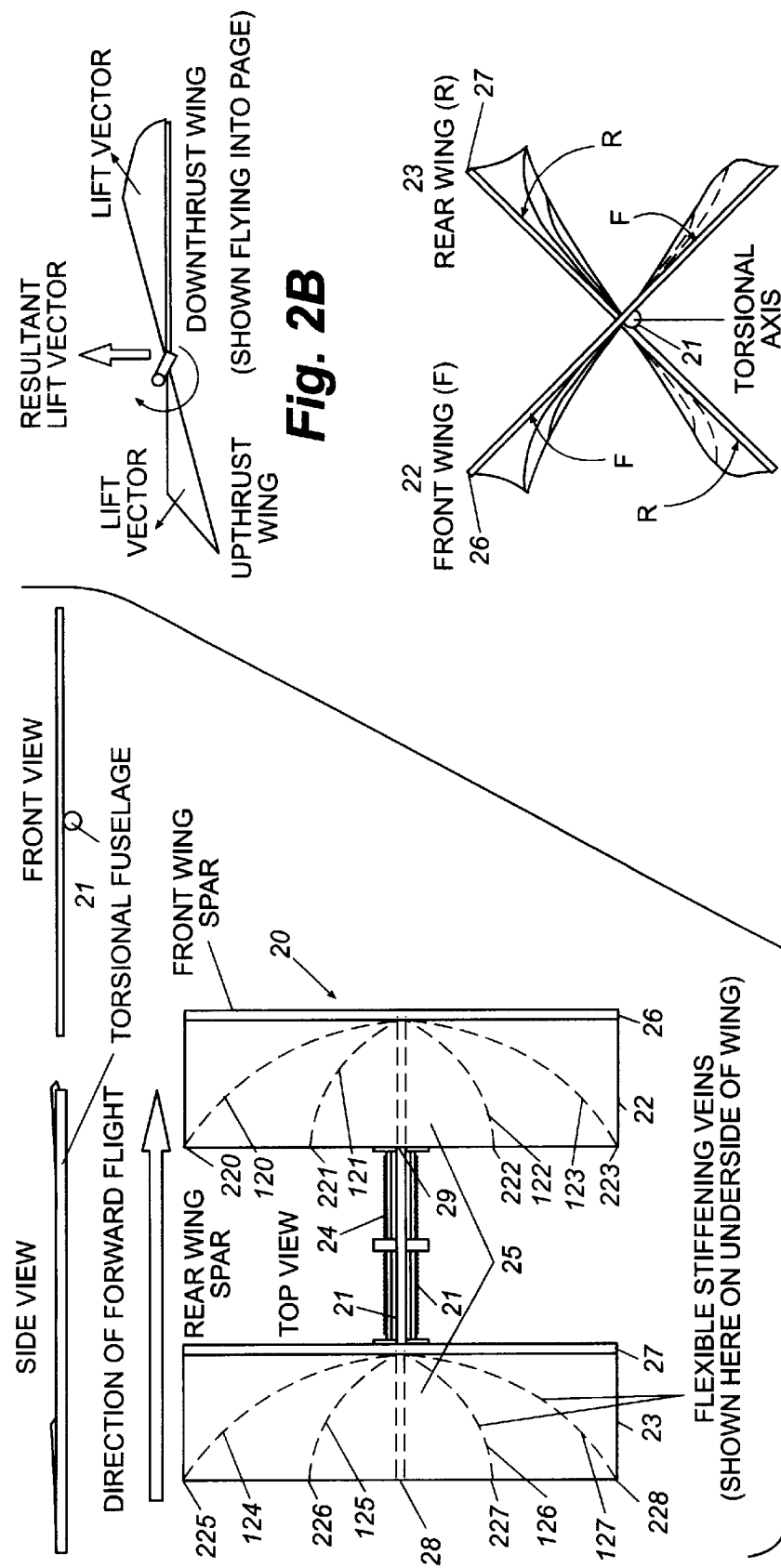

FIG. 2A illustrates the wing configuration of a second embodiment of an entomopter 20 in accordance with the present invention. In this embodiment, the entomopter 20 is constructed in an X-wing configuration having a fuselage 21; a front (forward) wing 22 pivotally coupled to the fuselage 21; a rear (aft) wing 23 pivotally coupled to the fuselage 21; and a controllable flapping means 24 coupled to both the forward and rear wings 22, 23. In an alternative embodiment (not shown), the X-wing configuration can be used with a pair of opposing wings as the forward wing and another pair of opposing wings as the aft wing. Yet another embodiment (not shown) has a single set of centrally located opposing wings.

The wings 22 and 23 are constructed of interstitial wing material that is attached along the entire wing spars 26 and 27 of both the front 22 and rear 23 wings. The interstitial wing material 25 is also attached along the fuselage 21 at 28 and 29. Flexible stiffening veins 120–127 are attached at the fuselage junction with each of the wing spars 26 and 27, and extend to points 220–223 on the front wing, and 225–228 on the rear wing to constrain the interstitial material under the opposite loads presented when the wing is flapping in an upstroke versus a downstroke. The purpose of these flexible stiffening veins 120–127 is to give the wing a proper camber to generate lift on both the upstroke and downstroke such that the resultant lift vector is upward, as illustrated in FIG. 2B.

FIG. 2C illustrates how the front and rear wings rotate in opposite directions within the same plane. It is imperative that the front and rear wings rotate with equal force, speed, and angular excursion such that there are always two wings engaged in an upstroke simultaneously with two wings engaged in a downstroke. Were this not to be the case, the air vehicle would twist along the roll axis. In one embodiment (not shown), the wings could be geared to assure equal and opposite flapping. The preferred embodiment is to have the wing spars 26 and 27 permanently attached to a torsional fuselage 21 which twists as the wing spars 26 and 27 rotate in opposite directions. This torsional fuselage 21 in turn stores energy as it is twisted, and returns this energy to the system after the wing spars 26 and 27 have completed their maximum rotational excursion, stop, and begin to rotate back in the opposite directions. The torsional forces generated by the rear wing 23 cancel those of the front wing 22, being resolved across the torsional fuselage 21. This is the basis of a resonant wing and fuselage structure. A power source such as the RCM (not shown) excites this resonant structure at its fundamental frequency of torsional oscillation.

FIG. 2D depicts a sequence in which the front and rear wings 22 and 23 flap through one half cycle. During this flapping, the interstitial material 25 comprising the aerodynamic surface of the wings 22 and 23 is deformed by predominantly aerodynamic forces and is constrained to hold a particular camber and angle of attack by the flexible stiffening veins 120–127. Also, as the wings 22 and 23 rotate in opposite directions, the torsional fuselage 21 twists in opposite directions from a center point or 0° node 128 equidistant between the front and rear wing spars where there is no twist, to points of maximum twist at either end of the fuselage. No matter what the angular wing position is at any point in time, the 0° node 128 remains at this midpoint between spars. It is at this 0° node 128 that the propulsion system and any payload is preferably mounted in order to avoid rotation of the propulsion system and payload, and to avoid disruption of the resonant wing-fuselage structure by adding a damping mass.

Figure 3A:
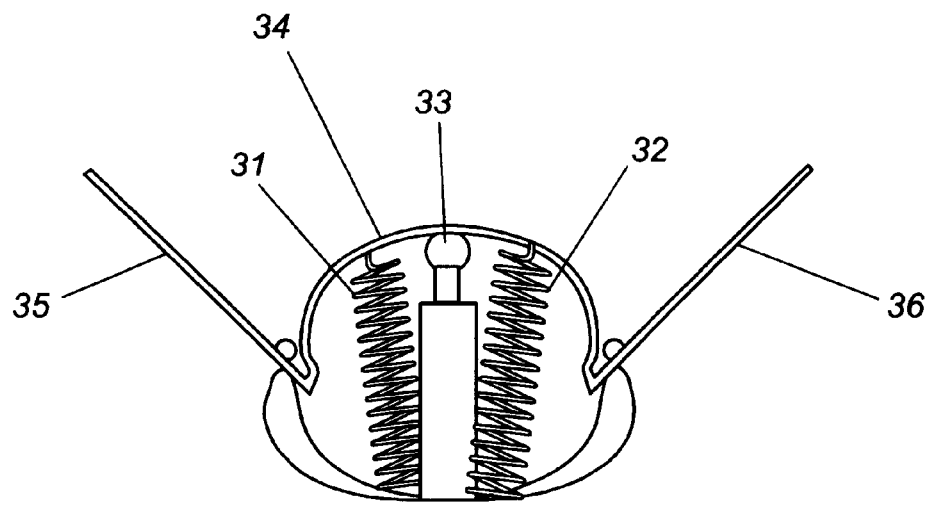
FIGS. 3A–3B are schematic diagrams illustrating one method for achieving reciprocating flapping-wing flight motions.
Figure 3B:
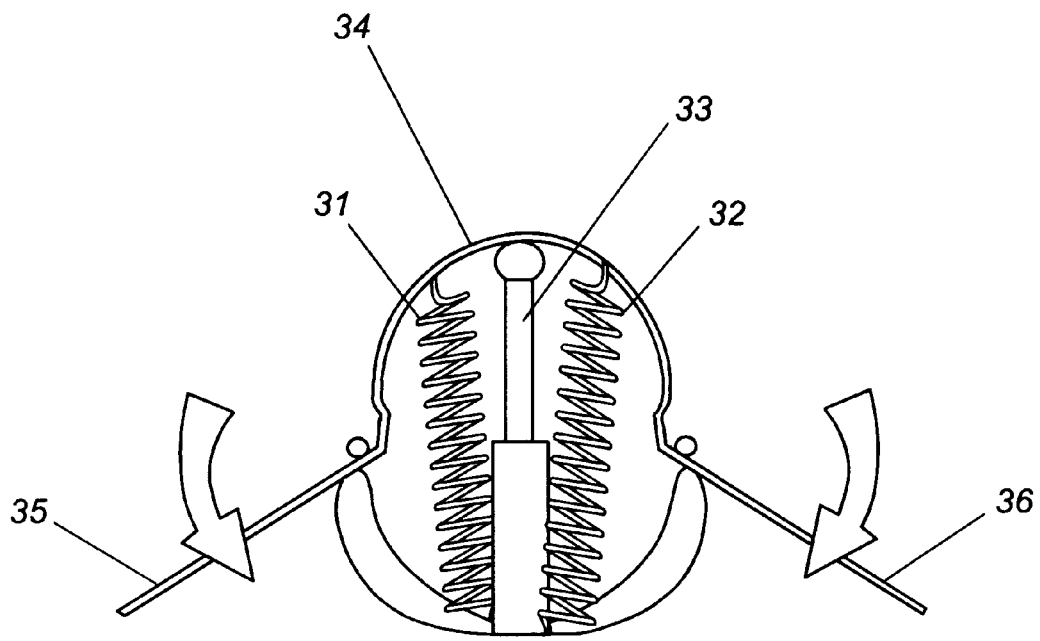

FIGS. 3A and 3B illustrate how conventional items such as springs and pistons can be used to drive the wings and legs of an entomopter in a reciprocating manner. In FIGS. 3A and 3B, two springs 31 and 32 and a piston 33 are contained within a flexible exoskeleton 34, which is linked mechanically to opposing wings 35 and 36. FIG. 3A illustrates the position of the wings 35 and 36 when the piston 33 compresses the springs 31 and 32, which causes compression of the flexible exoskeleton 34. FIG. 3B illustrates the movement of the wings 35 and 36 downward when the piston 33 and springs 31 and 32 expand the exoskeleton 34. Viewing FIGS. 3A and 3B together, the opposing wings are flapped upward (as the piston 33 contracts) and downward (as the piston 33 expands) with each cycle of the piston 33.

The power necessary to achieve flapping flight can be calculated from known formulas. For example, formulas derived by Azuma in Azuma, A., Springer—Verlag, *The Biokinetics of Flying and Swimming*, Tokyo, 1992. This power is mainly a function of the following variables: vehicle mass, flapping frequency, forward speed, wing chord, wing span and wing beat amplitude. The total power necessary for horizontal flight is computed as follows (where typical values are given and the quantities above are defined as):

| | |
|---|---|
| m = 0.05 | mass (kg) |
| U = 5 | forward flight velocity (m/s) |
| c = 0.05 | chord length (m) |
| b = 0.15 | wing span (m) |
| R = π/4 | range of flapping (radians) |
| $C_{DW}$ = 0.02 | drag coefficient of wings (experimental value for small birds) |
| η = 1 | drag efficiency |
| g = 9.81 | acceleration due to gravity (m/s$^2$) |
| ρ = 1.225 | density of air (kg/m$^3$) |
| $m_{eq}$ = 0.01 | mass of bird of equivalent size (kg) |
| (for calculation of parasite drag using an empirical formula) | |

The first step to calculating necessary power is to find the wing area. Wing area is independent of the presence of two or four wings. Equation (1) assumes a rectangular wing.

$$S = b \cdot c = 0.0075 \quad \text{wing area (m}^2\text{)} \tag{1}$$

The wing beat frequency is calculated using the following empirical model derived by Pennycuick (Azuma, 1992):

$$w = 1.08 \cdot (m^{1/3} \cdot b^{-1} \cdot S^{-1/4} \cdot \rho^{-1/3} \cdot g^{-1/2}) \tag{2}$$
$$= 26.39 \quad \text{wing beat frequency (Hz)}$$

The aspect ratio is a parameter indicating the flight performance of any flyer and is calculated in equation (3).

$$A = \frac{b^2}{S} = 3 \quad \text{aspect ratio} \tag{3}$$

Wing tip velocity is simply calculated with wing beat frequency, range of flapping, and wingspan (eq. 4).

$$V_t = w \cdot R \cdot b = 1.178 \quad \text{wing tip velocity (m/s)} \tag{4}$$

The drag area of the body (not including the wings) was estimated by Pennycuick by assuming a slender body and an elliptical cross section. This model was verified in wind tunnel tests by Tucker (Azuma, 1992).

$$f = (3.34 \cdot 10^{-3}) \cdot m_{eq}^{66} \tag{5}$$
$$= 1.599 \, \text{E-4 drag area of the body (m}^2\text{)}$$

Equation (6) calculates the parasite drag coefficient including the profile drag of both wings.

$$C_{DO} = \frac{f}{s} + C_{DW} = 0.0413 \quad \text{parasite site coefficient} \tag{6}$$

Equations (6) and (7) calculate the lift and drag coefficients respectively. These are assumed to be constant throughout the entire flapping motion.

$$C_L = (\pi \cdot A \cdot C_{DO})^{.5} = 0.624 \quad \text{lift coefficient} \tag{7}$$

-continued $$C_D = C_{DO} + \frac{C_L^2}{\pi \cdot A \cdot \eta} = 0.083 \quad \text{drag coefficient} \quad (8)$$

Equation (9) calculates a geometric parameter which is used to find the profile power. This parameter is always 0.1667 when a rectangular wing is assumed.

$$\sigma_2 = \frac{\int_0^1 \frac{c}{b} \cdot x^2 \cdot dx}{\int_0^1 \frac{c}{b} \cdot 2 \cdot dx} = 0.167 \quad \text{geometric parameter} \quad (9)$$

The profile power is the power that is required to overcome the drag of both flapping wings. It is very small compared to the induced power required maintain level flight. It is assumed to remain constant for change of forward flight.

$$P_O = .5 \cdot \rho \cdot U \cdot V_t^2 \cdot S \cdot C_{DW} \cdot \sigma_2 \quad (10)$$

$$= 1.063 \text{ E-4} \quad \text{profile power (Watts)}$$

The weight of the vehicle is simply calculated in equation (11) using gravity and mass.

$$W = m \cdot g = 0.491 \quad \text{weight (N)} \quad (11)$$

The total necessary power is calculated for horizontal flight in equation (12):

$$P_n = P_O + \left[ \left( \frac{C_{DO}^2}{\pi \cdot A} + C_{DO} \right) \cdot \frac{\rho \cdot S}{2} \cdot U^3 \right] +$$

$$\left[ \frac{1}{\pi \cdot A} \cdot \left( 1 + \frac{2 \cdot C_{DO}}{\pi \cdot A} \right) \cdot \frac{2 \cdot W^2}{S \cdot \rho \cdot U} \right] +$$

$$\left[ \frac{1}{(\pi \cdot A)^3} \cdot \frac{\left(\frac{W}{S}\right)^3}{\left(\frac{\rho}{2}\right)^3} \cdot \frac{W}{U^5} \right]$$

$$= 1.373 \quad \text{necessary power (Watts)}$$

For the typical values shown for a 50 gram entomopter vehicle with various second order effects assumed to be ideal, calculations show that approximately 1 Watt of power is required to sustain flight in a flapping-wing MAV at a forward velocity on the order of 10 m/sec, assuming a wing flapping frequency of about 26 Hz.

Figure 4:
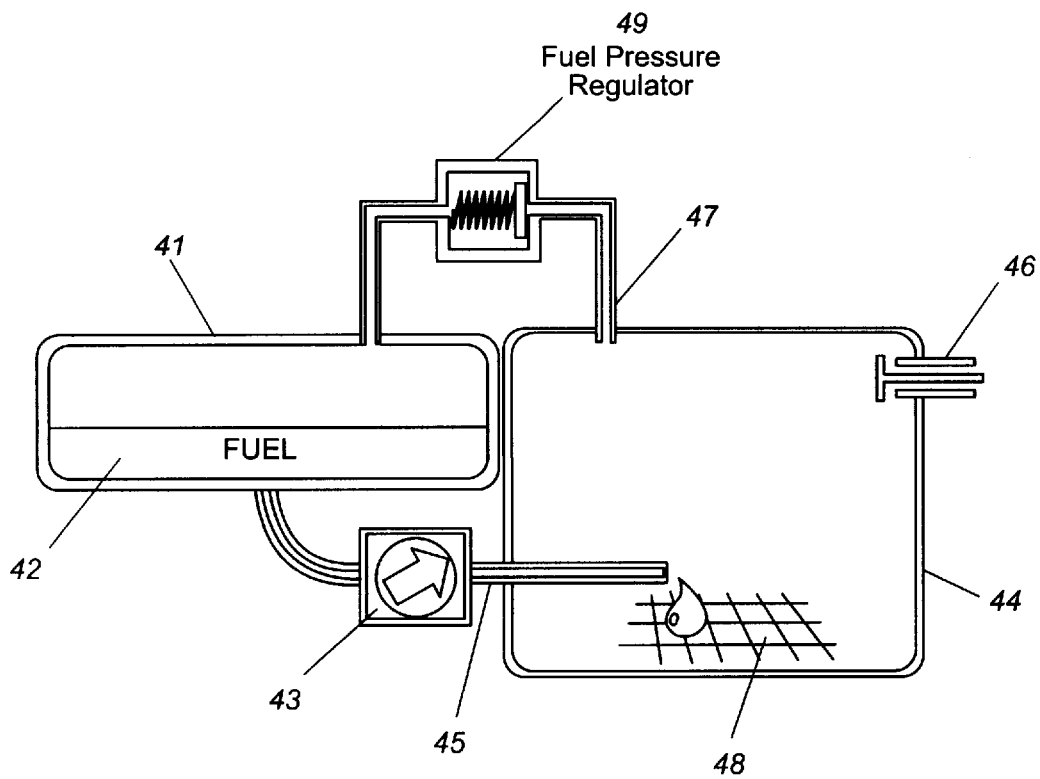
FIG. 4 is a schematic diagram illustrating a first embodiment of a reciprocating chemical muscle (RCM) for powering the reciprocating flapping-wing flight motions of FIGS. 2A–2D and FIGS. 3A–3B.
Figure 5:
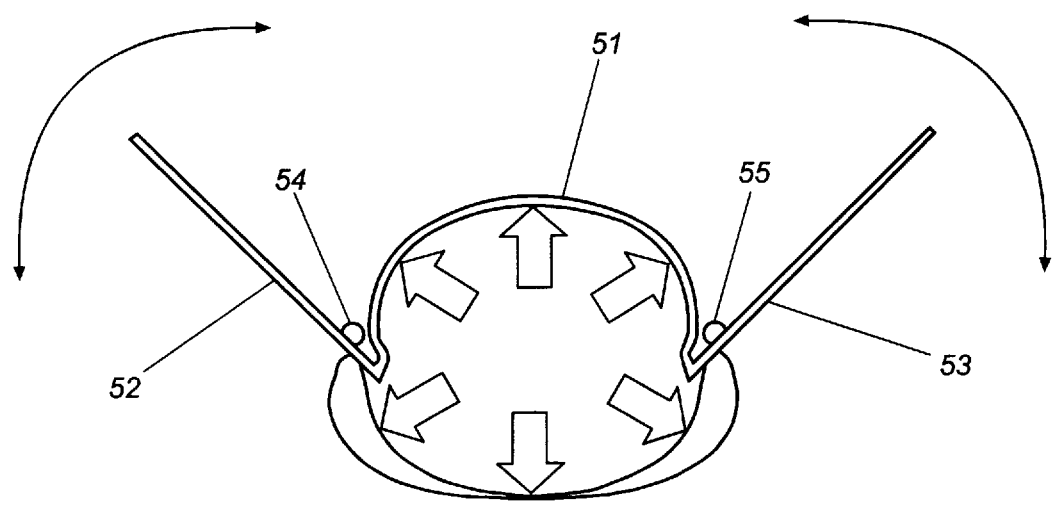
FIG. 5 is a schematic diagram illustrating the RCM of FIG. 4 being used to achieve the reciprocating flapping-wing flight motions of FIGS. 3A–3B.

FIGS. 4 and 5 illustrate a first embodiment of a reciprocating chemical muscle (RCM) that can be used as a source of power for the entomopter. In FIG. 4, a pressurized fuel storage vessel 41 containing a monopropellant 42 is connected through a metering device 43 into a reaction chamber 44 having an input port 45, an exhaust port 46, and a feedback port 47. The reaction chamber 44 contains a catalyst 48 that is reactive with the monopropellant 42. The monopropellant 42 is metered through the metering device 43 into reaction chamber 44 through input port 45. When the monopropellant 42 comes into contact with the catalyst 48, the monopropellant 42 reacts with the catalyst 48 in a noncombustive catalytic reaction in which the monopropellant decomposes into heat and gas.

The pressurization of the reaction chamber also is used to pressurize the fuel storage vessel 41 through the feedback port 47, thereby providing positive flow control of the monopropellant 42 through the metering device 43 into the reaction chamber 44. A fuel pressure regulator 49 (such as a one-way valve) is placed between the feedback port 47 and the fuel storage vessel 41. The fuel pressure regulator 49 allows the fuel storage vessel 41 to be pressurized when there is a greater pressure in the reaction chamber 44 than in the fuel storage vessel 41. If the pressure in the reaction chamber 44 is lower than the pressure in the fuel storage vessel 41, the pressure in the fuel storage vessel 41 is maintained by the fuel pressure regulator 49 until such time as the pressure in the fuel storage vessel 41 falls below that of the reaction chamber 44. Alternatively, the flow control can be achieved by using a fuel pump (not shown). Waste products of the reaction are vented through output port 46 and can be used elsewhere or simply discarded. The reaction chamber 44 is constructed of a flexible material with an elastic memory. The useful gas and heat do not immediately exit the reaction chamber, but instead are used to expand the reaction chamber itself during each cycle of the reaction.

In a preferred embodiment of the invention, the metering is calculated and maintained constant for each cycle of the RCM to achieve autonomic wing beating. Autonomic wing beating means that the wings are beat regeneratively and involuntarily (i.e., with no controlled modification of the beat frequency, amplitude or phase). For flight, the wing frequency is on the order of 10 Hz and greater. The same RCM motions that create flapping also can be used to create an autonomic crawling motion. When crawling is desired, the RCM frequency will be reduced to less than 10 Hz, which will be sufficient for crawling but of too low a frequency to create sufficient lift for flight.

FIG. 5 illustrates the use of the RCM of FIG. 4 to drive the wings of an entomopter. The reaction chamber 51 functions similarly to a bellows, which can be used to drive the wings 52 and 53 of the entomopter upward and downward through wing spars 54 and 55. The same RCM can be used to power the legs of an entomopter as well (not shown in the drawing).

Figure 6:
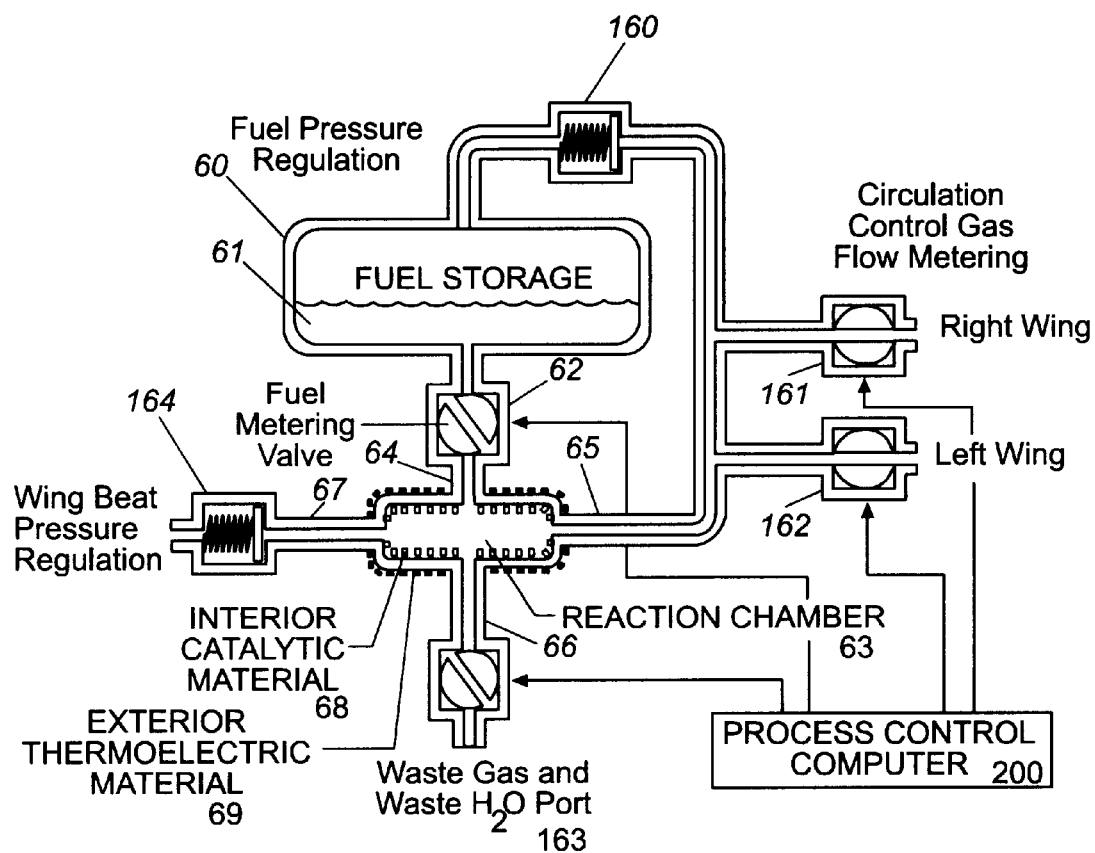
FIG. 6 is a schematic diagram illustrating a second embodiment of a RCM for powering the reciprocating flapping-wing flight motions of FIGS. 2A–2D and 3A–3B.

FIG. 6 illustrates a second embodiment of a RCM that can be used to power an entomopter. In this embodiment, a pressurized fuel storage vessel 60 containing a monopropellant 61 is connected through a metering device 62 into a reaction chamber 63 having an input port 64 and three output ports 65, 66 and 67. The metering device 62 also acts as a one-way valve to prevent reverse flow of the monopropellant from the reaction chamber 63 back into the fuel storage vessel 60. The reaction chamber 63 contains a catalyst 68 that is reactive with the monopropellant 61. The exterior of the reaction chamber is maintained in thermal contact with a thermoelectric power generator 69.

The monopropellant fuel activating the RCM must be metered. Metered flow is a function of the orifice size of the metering device 62 and the input port 64, the pressure of the fuel storage vessel 60, and the efficiency of the catalytic reaction. In this embodiment, the fuel is metered by regulating the flow through metering device 62 based on pressurization of the fuel storage vessel 60. In lieu of a fuel pump (which could be used in an alternate embodiment), this embodiment uses the pressure of the reaction to force more monopropellant 61 into the reaction chamber 63 once the pressure in the reaction chamber 63 has dropped as mass is vented during each cycle of the RCM. A pressure regulator 160 (such as a pulsed valve or a "spring" regulator) is connected to output port 65 and maintains a positive pressure in the fuel storage vessel 60.

The power generated by the RCM is interfaced to the wings of the entomopter from the reaction chamber 63 through output port 65 via one or more valves 161 and 162. The same valving technique used to pressurize the fuel storage vessel 60 (as described above) is utilized with respect to valves 161 and 162. Any waste products are periodically expelled from the reaction chamber under pressure derived from the reaction chamber itself The same valving technique used to pressurize the fuel storage vessel 60 (as described above) is used to expel the waste products through a valve 163 connected to output port 66.

The pressure of the reaction chamber is also used to regulate the wing beat frequency and amplitude through a pressure regulator 164 (such as a pulsed valve or a "spring" regulator), which is connected to output port 67. This pressure is used to operate actuators which are linked mechanically to the wings of the entomopter (illustrated in FIGS. 13A–13D and discussed below). Reaction gases are also passed through the entomopter's hollow flexible stiffening veins 120–127 of FIG. 2A in the wings and out slots to create higher coefficients of lift ($C_L$) and directional control in an otherwise autonomic (involuntary, uncontrolled) flapping wing. In a preferred embodiment, the metering device 62, and valves 161, 162 and 163 of FIG. 6 are controlled by a processor 200.

In order to modify their flight path in any direction, insects move their wings with various degrees of freedom which include flapping up and down, lead-lag motions along the body (fuselage) axis, twist about the wing root (thereby varying angles of attack), and in the case of birds, span can even be adjusted as when a pelican partially folds its wings to dive. These degrees of freedom are difficult to replicate as the size of the flying machine grows smaller and smaller. A unique feature of the aforementioned embodiments when used in conjunction with the RCM, is that only autonomic up and down wing beating is necessary if the circulation of the air over the wings is controlled by other means, and the interstitial wing materials are made to deform predictably, but differently, under the aerodynamic forces of the up beat versus those of the down beat. None of the other degrees of freedom commonly associated with insect wing movement need to be controlled from the wing root by actuators in order to generate lift, forward propulsion, and navigation.

A byproduct of the RCM is waste gas under pressure. If this waste gas is vented into the wings themselves through the hollow flexible stiffening veins (depicted in FIG. 2A) that control the shape of the wings, then the lift of each individual wing can be modified. In the preferred embodiment, equal force, stroke, and frequency are maintained under all flight conditions, with changes in individual wing lift being periodically modified by venting gas from slots along the surface of the wing. This technique of lift modification, commonly termed "circulation control", can either enhance or spoil lift by causing the flow over the wing to remain attached to the surface of the wing longer than would naturally occur thereby increasing lift, or by disrupting leading edge vortices that naturally propagate along the surface of a flapping wing, thereby decreasing lift. Application of increased or decreased lift on one wing will cause an "aileron effect" which will steer the entomopter to the right or left during flight. Increasing or decreasing the flapping frequency, or applying circulation control to both wings simultaneously, will cause the entomopter to climb or descend.

Valves 161, 162 in FIG. 6 vent pressurized waste gas from the reciprocating chemical muscle out through the hollow flexible stiffening veins (120–127 in FIG. 2) in the wings, to slots along the wing. The vented gas interacts with the flow over the wing to increase or decrease lift depending upon how this gas is injected into the free stream air passing over the wing during flapping flight. The venting of the waste gas is modulated under the control of a processor 200 (FIG. 6) that computes gas venting locations and durations based on real time input from stability, control, and navigation sensors (not shown), as well as stored information about what the entomopter should be doing at a given moment or point in space. Modifying lift on both front wings or both rear wings independently, will result in pitching moments in the fuselage, and a change in body angle and altitude. Simultaneously modifying lift on both wings on a given side will result in a rolling moment about the fuselage axis. If the wings contain a slight dihedral angle, this rolling moment will in turn result in an aileron motion which will cause the vehicle to change heading. Equal and simultaneous modification of lift on the right side of the front wing and the left side of the rear wing (or vice versa), will result in a net change in the vertical lift vector, but will not change vehicle attitude. Similarly, equal and simultaneous modification of lift on all wings will result in a net change in the vertical lift vector, but will not change vehicle attitude. This latter lift modification could be useful in slowing and flairing the vehicle for landing (as flaps would do in a conventional aircraft) or in dropping the vehicle quickly in altitude (as spoilers would do in a conventional aircraft).

The chemical reaction between the monopropellant 61 and the catalyst 68 in FIG. 6 is exothermic. A monopropellant is a chemical which breaks down to primary constituents and heat when it comes in contact with various catalytic materials. Monopropellants of interest for use in the RCM rapidly decompose exothermically from a liquid into gasses. No ignition source is involved in the process, and no oxidizer is necessary. The RCM embodiment depicted in FIG. 6 uses the heat liberated by the chemical reaction to generate small amounts of electrical power. This is accomplished by maintaining thermal contact between the exterior of the reaction chamber 63 and a thermoelectric power generator 69. The thermoelectric power generator 69 can be any conventional thermoelectric device, such as a thermocouple. More efficient thermoelectric power generators may be developed for specific use with the RCM.

In a preferred embodiment, the monopropellant used in the RCM illustrated in FIGS. 4–6 is hydrogen peroxide ($H_2O_2$), and in particular high concentration hydrogen peroxide, which is defined as a hydrogen peroxide solution of 70% or greater and is designated herein by the acronym HCHP. HCHP was selected for the preferred embodiment due to its ease of storage and handling, and lower cost. However, other monopropellants such as hydrazine ($H_2NNH_2$), which has a greater energy density than HCHP, may be used without departing from the spirit and scope of the invention.

In the preferred embodiment, the concentration and purity of the hydrogen peroxide ($H_2O_2$) fuel determines the heat of reaction which is critical to the formation of $H_2O$ in a gaseous phase rather than in a liquid phase. It is important to have $H_2O_2$ of sufficient purity to allow the heat of reaction to be beyond the boiling point of water so that the $H_2O$ formed by the reaction is gaseous steam rather than liquid water. Too low a concentration of $H_2O_2$ will produce too much liquid water which in turn dilutes the incoming $H_2O_2$ and quenches the reaction. This can be avoided by using $H_2O_2$ concentrations above 70%.

The hydrogen peroxide ($H_2O_2$) bought in pharmacies, is a stabilized 3% solution that has been used as a topical antiseptic the beginning of the twentieth century. When hydrogen peroxide is concentrated (above 52% by weight), it violently reacts with certain metals and oxides (catalysts), decomposing into gaseous oxygen and superheated steam. When HCHP of 70% and above comes in contact with certain metals like copper, iron, silver, or lead it decomposes exothermically, giving off pure oxygen, water as steam, and heat. The decomposition follows the reaction:

$$2H_2O_2 \rightarrow 2H_2O+O_2(gas)+heat$$

For example, the gas generated by one pound of 90% $H_2O_2$ upon complete decomposition (at an ambient temperature of 70° F.), gives off 60.3 cubic feet of gas ($O_2$+steam) and the heat given in the reaction will reach 1,364 degrees Fahrenheit in about 25 milliseconds. Of the gas generated 43% is $O_2$.

$H_2O_2$ will react with a wide range of catalysts that include various precious metals such as silver and platinum, as well as common metals such as iron and various metallic oxides. Preferred catalysts will be light weight and can be applied to the surface of other materials. Critical to the rapid catalytic decomposition of a monopropellant is catalyst surface area and adequate monopropellant aspiration over that surface area. The better catalysts will contain micro pores as a means of increasing surface area.

Figure 7A:
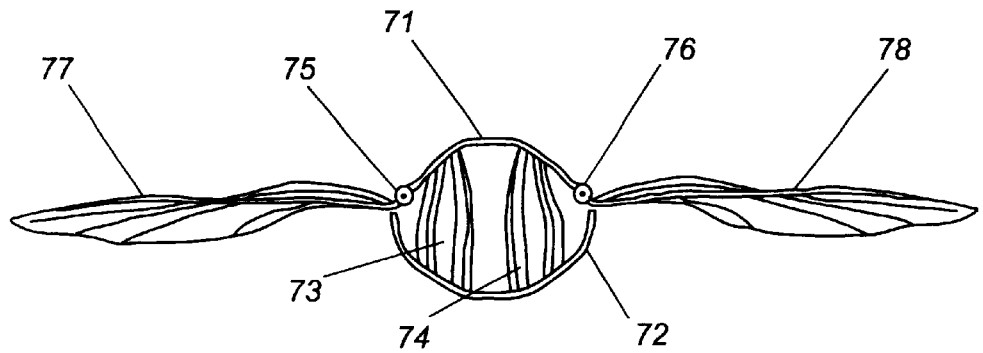
FIGS. 7A–7C are simplified schematic diagrams illustrating the kinematics of a flapping-wing insect.
Figure 7B:
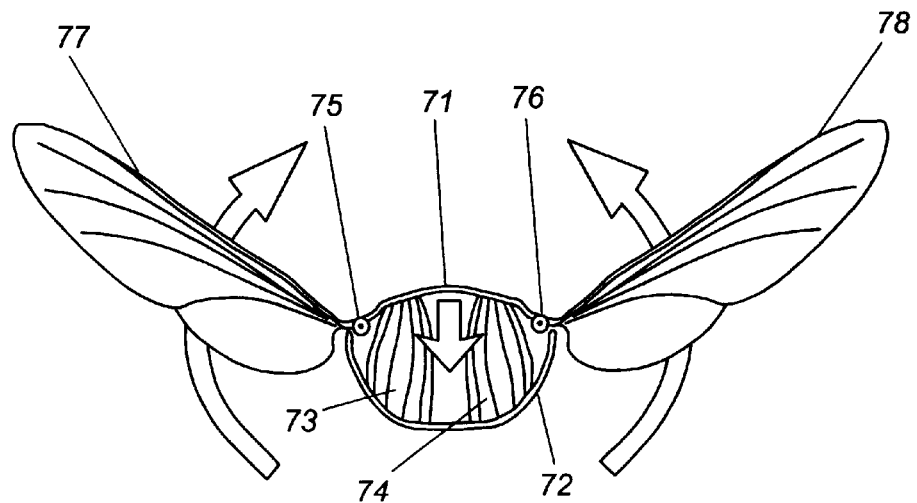
Figure 7C:
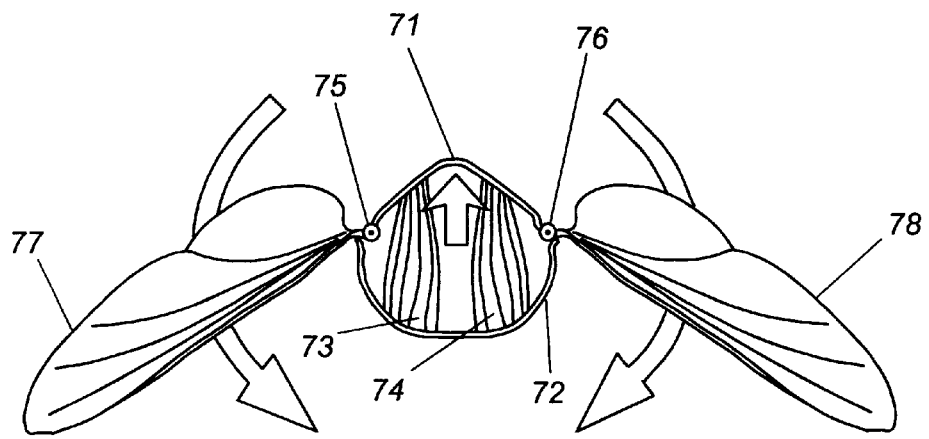

FIGS. 7A–7C illustrate the simplified kinematics for an insect 70. The insect's exoskeletal thorax is comprised of an upper plate called the "tergum" 71 and a lower channel called the "sternum" 72. Interior musculature 73 and 74 connecting the tergum 71 and sternum 72 can contract and expand to deform the tergum 71 relative to the sternum 72. The tergum 71 and sternum 72 are connected by spars 75 and 76 to the wings 77 and 78. FIG. 7A depicts the tergum 71 and sternum 72, and the wings 77 and 78, in a position of equilibrium. FIG. 7B shows the muscles 73 and 74 pulling the tergum 71 down toward the sternum 72. The wing spars 75 and 76 are cantilevered in such a way that as the tergum 71 is pulled down, the wings 77 and 78 must rise. The opposite action is shown in FIG. 7C, where the muscles 73 and 74 push the tergum 71 up away from the sternum 72, thereby forcing the wings 77 and 78 to deflect downward. Insect (wasp) muscles have been measured to contract only about 2 percent (Gilmour, K. M., Ellington, C. P., *Journal of Experimental Biology*, No. 183, pg. 101, 1993) and for the fruit fly *Drosophila hydei*, are only about 10 percent efficient (Dickson, M. H., Lighton, J. R. B., "Muscle Efficiency and Elastic Storage in the Flight Motor of Drosophila," *Science*, Volume 268, Apr. 7, 1995, pp.87–90). Key to the flight efficiency of insects is the principal of resonance, the ability to store mechanical energy temporarily in biological materials such as resolin and the flexure of the tergum. Also very important is the interaction of leading edge vortices created by the beating of the wings, and which "roll" over both the upper and lower surfaces of the wings (shown in experiments by Ellington, 1997).

Figure 8A:
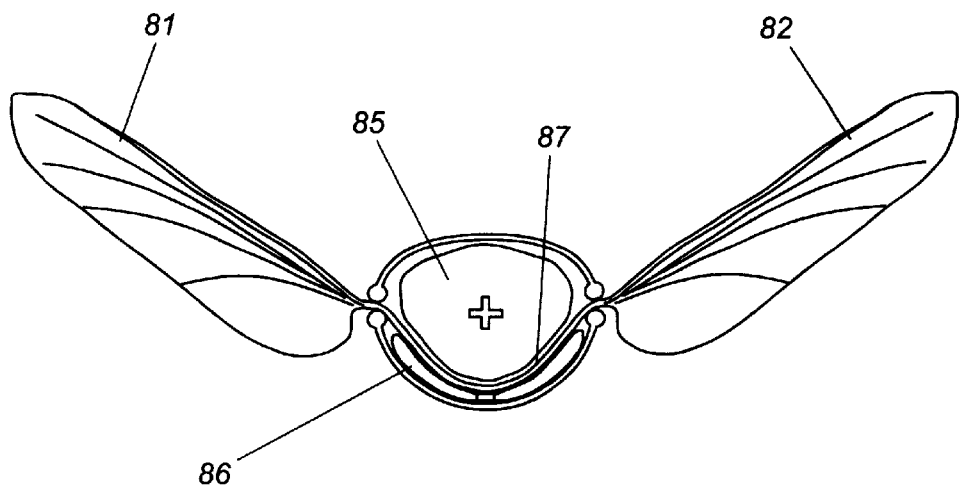
FIGS. 8A–8C are schematic diagrams illustrating an embodiment of an entomopter that having the reciprocating flapping-wing flight motions of FIGS. 7A–7C.
Figure 8B:
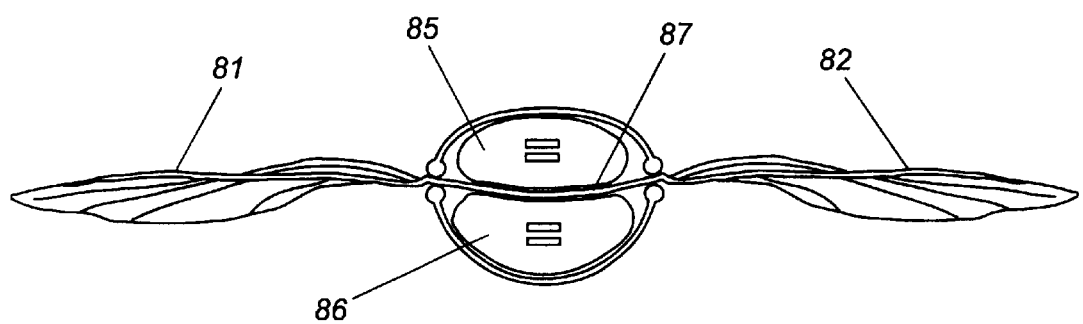
Figure 8C:
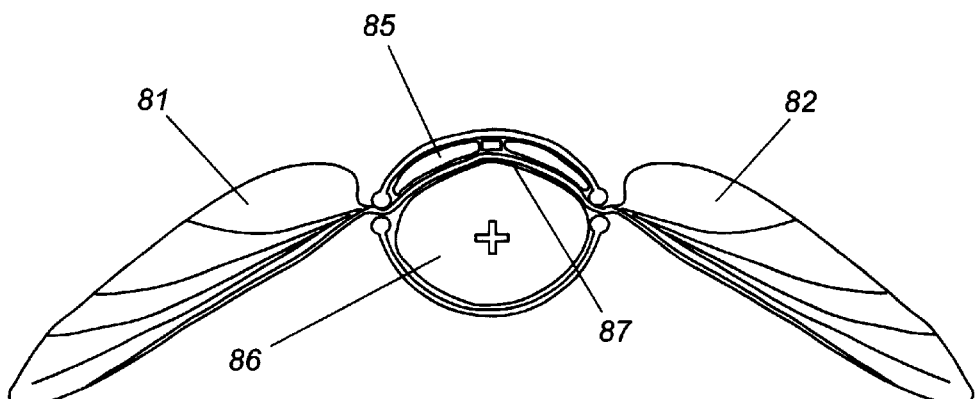

FIGS. 8A–8C illustrate an embodiment of an entomopter 80 that employs similar techniques to those described with reference to FIGS. 7A–7C to flap its wings 81 and 82. In this embodiment, a power source, which in a preferred embodiment is a RCM, is used to alternately pressurize and depressurize bladders 85 and 86 placed above and below the wings 81 and 82. The wings 81 and 82 are connected by a flexible strap 87 bisecting bladders 85 and 86. The wings 81 and 82 are deflected by inflating one bladder while exhausting the other. As shown in FIG. 8A, inflating the upper bladder 85 while exhausting the lower bladder 86 deflects the wings 81 and 82 upward. FIG. 8B depicts the wings 81 and 82 in equilibrium as the pressure in the bladders 85 and 86 is equalized. In FIG. 8C the wings 81 and 82 are deflected downward by inflating the lower bladder 86 and exhausting the upper bladder 85.

Figure 9:
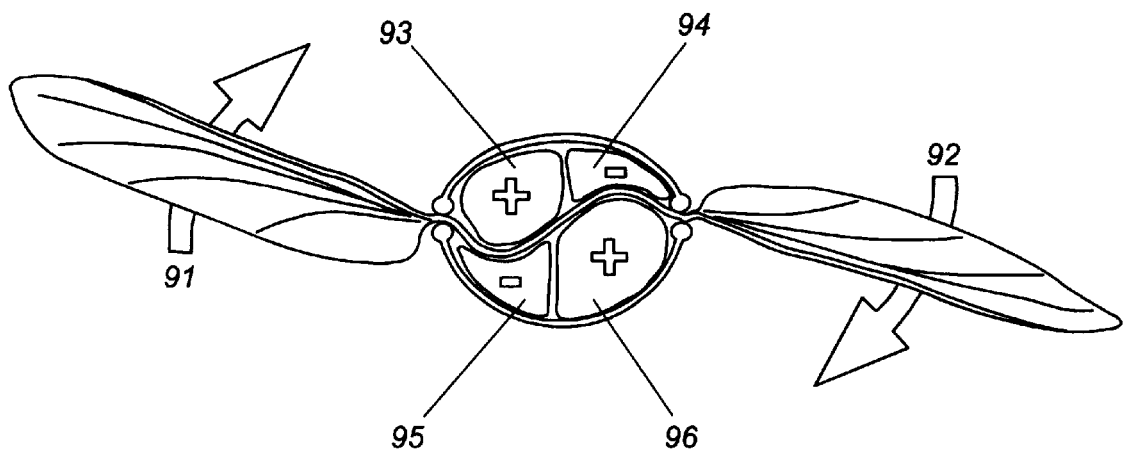
FIG. 9 is a schematic diagram illustrating a variation of the embodiment of FIGS. 8A–8C for achieving reciprocating flapping-wing flight motions in an entomopter.

FIG. 9 illustrates another embodiment similar to FIGS. 8A–8C, except that the embodiment of FIG. 9 uses bilaterally symmetrical upper bladders 93 and 94 and lower bladders 95 and 96, which are inflated differentially to create an uneven wing beat, driving one of the wings 91 up while the other the wing 92 is being driven down. This process can be used to drive the forward and rear wings of the X-wing entomopter configuration of FIG. B.

Alternatively, the entomopter can be configured with a flexible exoskeleton instead of the bladder configuration of FIGS. 8A–8C and 9. In that case, the RCM's reaction chamber would be flexible and the reciprocating motion of the reaction chamber itself would drive the wings in the same manner as illustrated in and discussed with respect to FIGS. 3–5.

Figure 10:
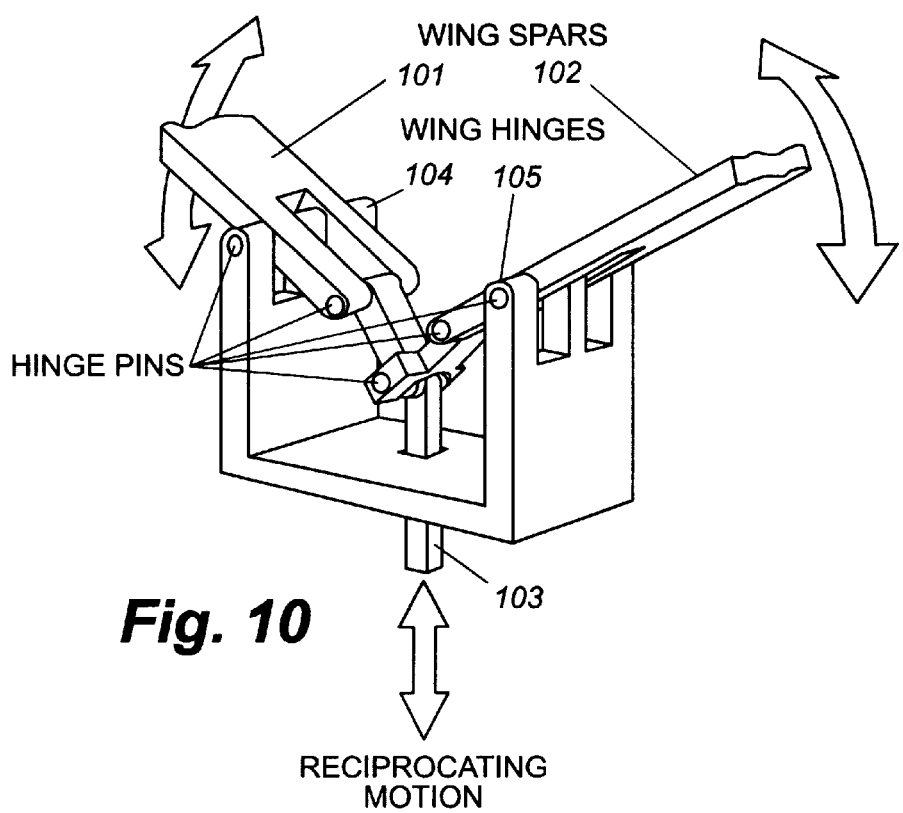
FIG. 10 is a schematic diagram of a first embodiment of a mechanical linkage structure that uses reciprocating motion to drive the wings of a flapping-wing entomopter.

FIG. 10 illustrates one embodiment of a mechanical linkage structure between a reciprocating actuator such as a RCM and the wings of an entomopter. In this embodiment, vertical reciprocating motion produced by a reciprocating actuator such as a RCM (not shown), is applied at point 103. The wing spars 101 and 102 of an opposing wing entomopter configuration, such as the configuration illustrated in FIG. 1, are hinged on either side of point 103 by wing hinges 104 and 105. The vertical reciprocating motion applied at point 103 is communicated mechanically to the wing spars 101 and 102, resulting in opposing wing flapping of equal stroke, force and speed.

Figure 11:
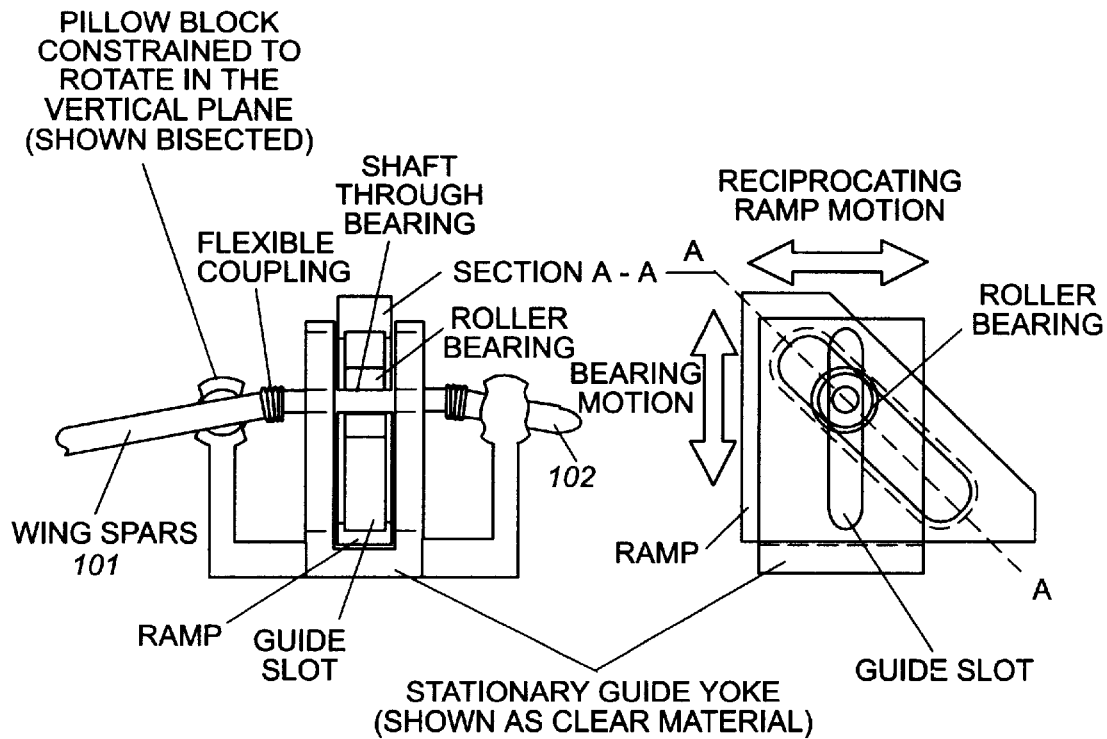
FIG. 11 is a schematic diagram of a second embodiment of a mechanical linkage structure that uses reciprocating motion to drive the wings of a flapping-wing entomopter.

FIG. 11 illustrates another embodiment of a mechanical linkage between a reciprocating actuator such as a RCM and the wings of an entomopter. In this embodiment, horizontal reciprocating motion produced by an actuator such as a RCM (not shown), is applied to the wing spars 101 and 102 through a mechanical linkage such as that shown in the drawing.

Figure 12A:
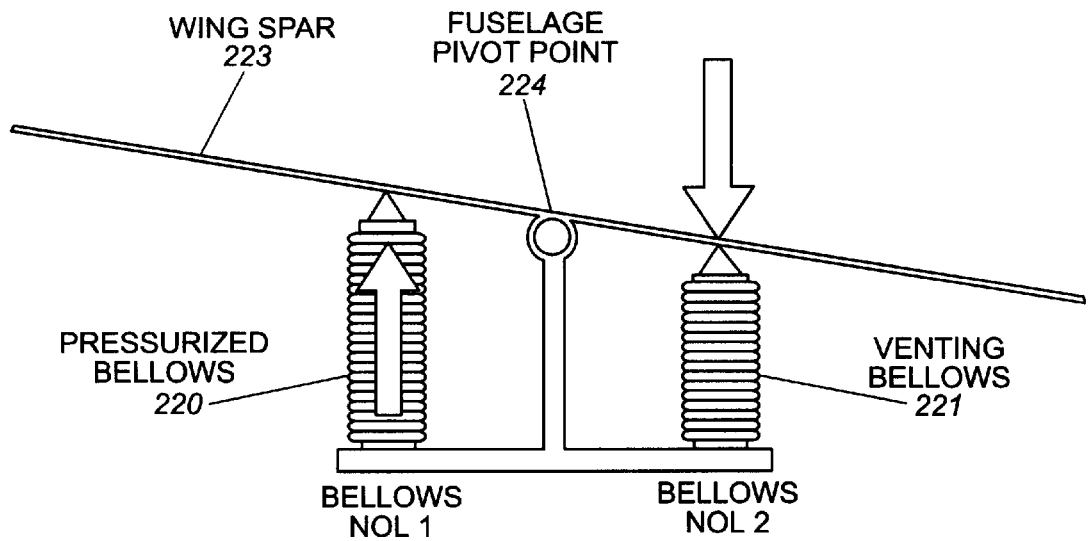
FIGS. 12A–12B are schematic diagrams illustrating a first embodiment of a flapping mechanism for driving the wings of a flapping-wing entomopter.
Figure 12B:
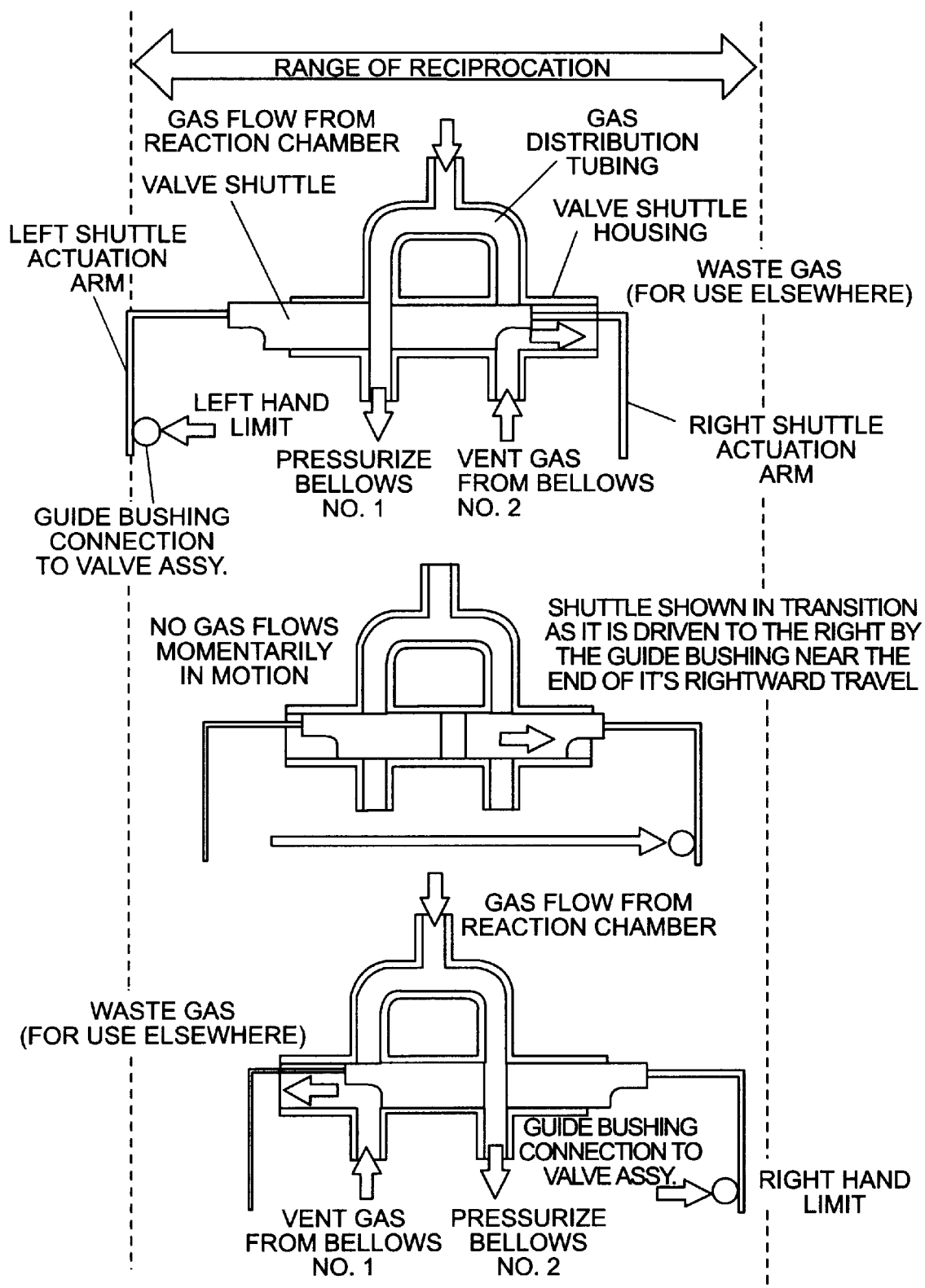

FIGS. 12A and 12B show one embodiment of a flapping means for driving a wing spar. In FIG. 12A, a pair of bellows 220 and 221 are mechanically coupled to the underside of the wing spar 223, one bellows on each side of the fuselage pivot point 224. The bellows 220 and 221 are alternately pressurized and vented. First bellows 220 is pressurized while bellows 221 is vented. A change in the position of a valve 230 (illustrated in FIG. 12B) reverses the action to vent bellows 220 while bellows 221 is pressurized. This valve 230 is actuated at the maximum extent of the excursion of either bellows such that the process is self sustaining. As one bellows is pressurized, it expands linearly and forces the wing spar 223 upward through a pinned on one side of the fuselage pivot point 224, which forces the wing 40 spar downward on the opposing side of the pivot point 224. This also serves to push the gas out of the other (venting) bellows which shrinks in length, at first on its own as it returns to its resting length, and then under the force of the pressurized bellows acting through the wing spar. The rate at which this process is repeated depends on pressure and mass flow into the bellows, as well as resistance within the wing system (aerodynamic, friction, elastic storage) opposing motion. Though mechanically simple, this embodiment presents significant forward flat plate resistance to air flow during flight.

Figure 13A:
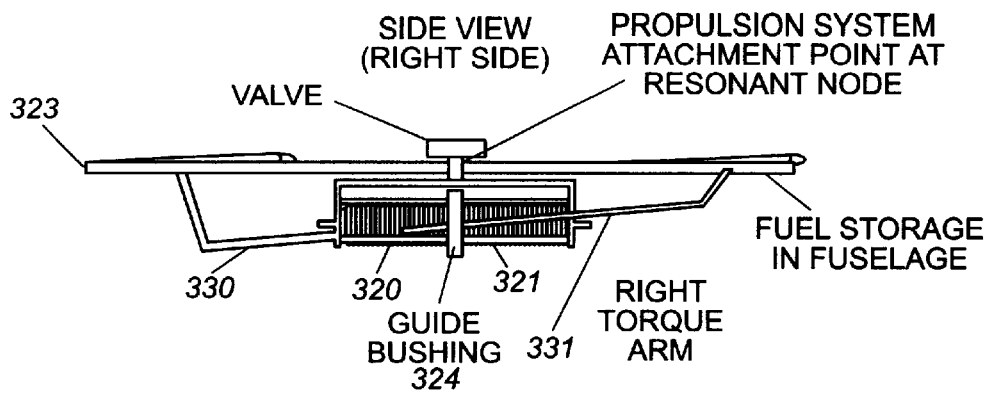
FIGS. 13A–13E are schematic diagrams illustrating a second embodiment of a flapping mechanism for driving the wings of a flapping-wing entomopter.
Figure 13B:
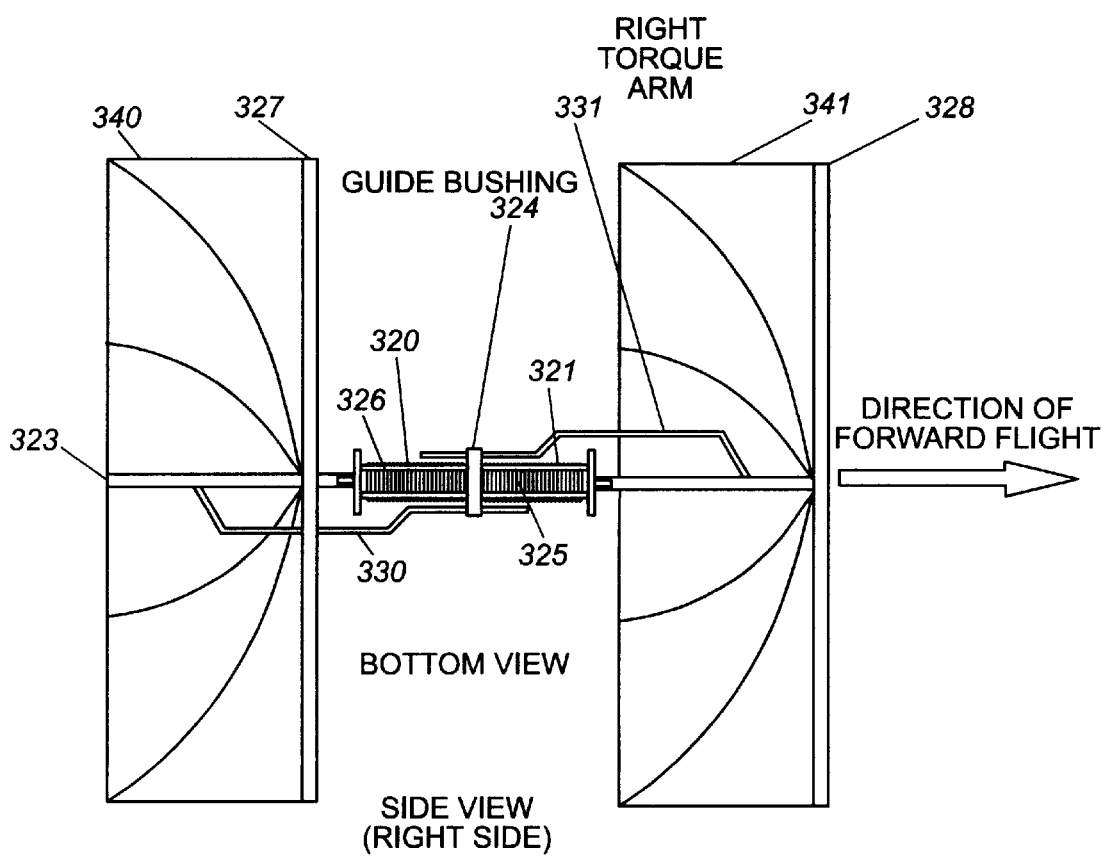
Figure 13C:
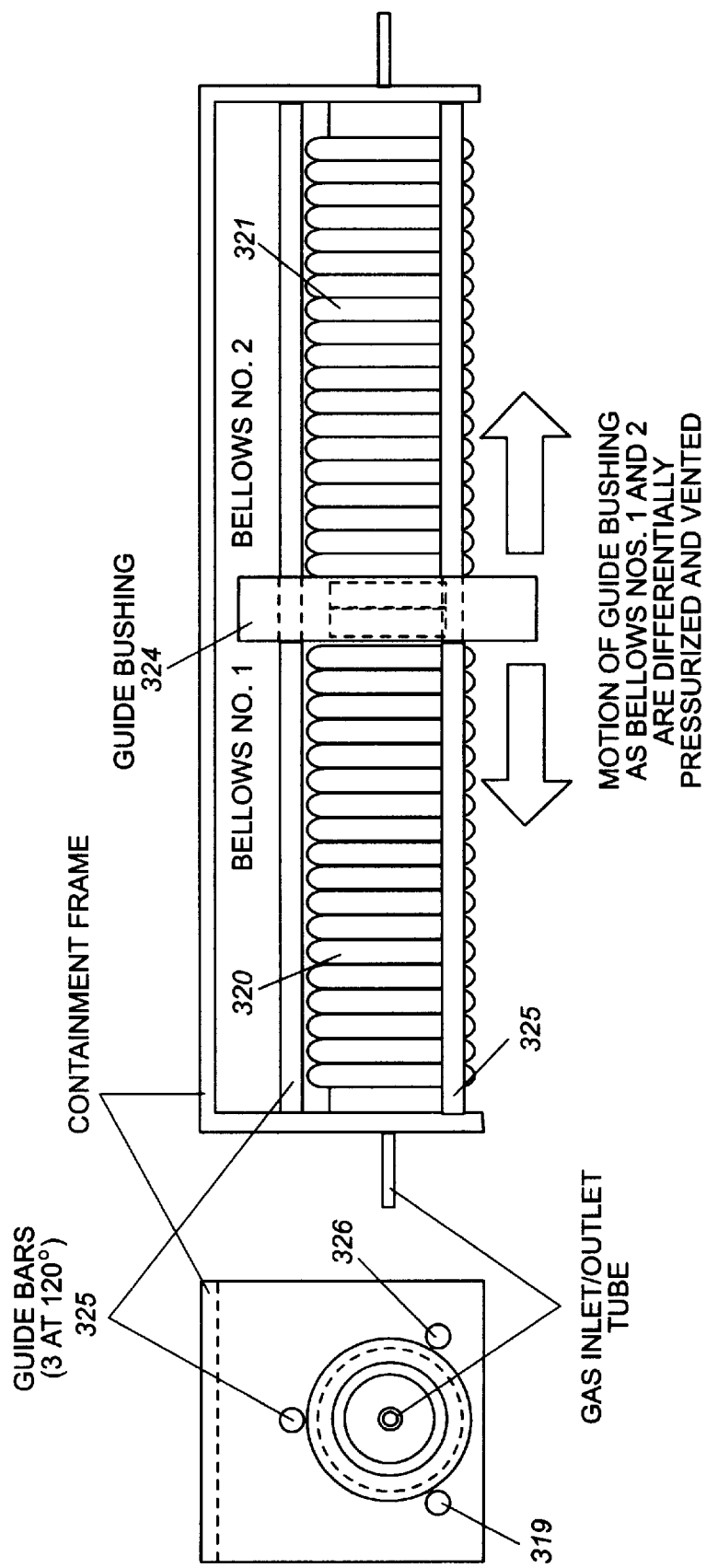

A preferred embodiment is shown in FIGS. 13A–13E where the bellows 320 and 321 are oriented in line with each other and are placed in line with and beneath a torsional fuselage 323 to provide minimum flat plate drag. With reference to FIGS. 13B and 13C, the bellows 320 and 321 oppose each other in the center. A guide bushing 324 separates the bellows 320 and 321 and moves back and forth along guide bars 319, 325 and 326 as the bellows 320 and 321 are alternately pressurized and vented. With reference to FIGS. 13A and 13B, the entire propulsion system is mounted at the torsional node equidistant between each of the wing spars 327 and 328. The torsional fuselage 323 can be used to store fuel, or alternately, a separate fuel tank can be mounted on the fuselage 323. As with any aircraft, weight and balance is critical for trimmed flight, so attention must be paid to the location of the fuel source.

Torque arms 330 and 331 are attached to either side of the torsional fuselage, one near the front, and one near the rear, and are threaded through the guide bushing 324. These torque arms 330 and 331 are oriented in the vertical plane at an angle (shown in FIG. 13D as 5°). The points where the torque arms 330 and 331 are attached to the torsional fuselage 323 are selected depending on the extent of linear travel of the reciprocating propulsion source, and the desired wing flapping angle. As the guide bushing 324 oscillates back and forth, the torque arms 330 and 331 are forced up and down to remain aligned with the holes in the guide bushing 324 through which they pass.

Figure 13D:
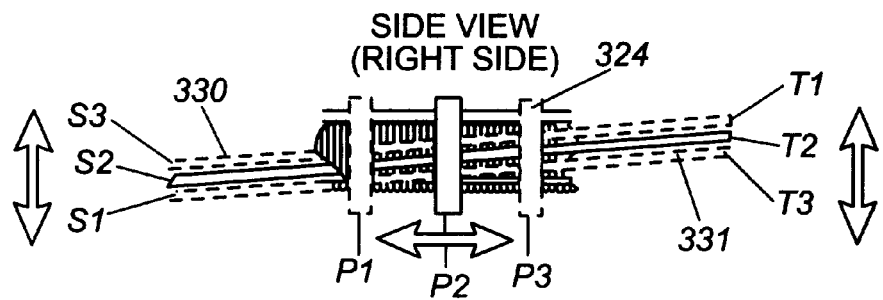
Figure 13E:
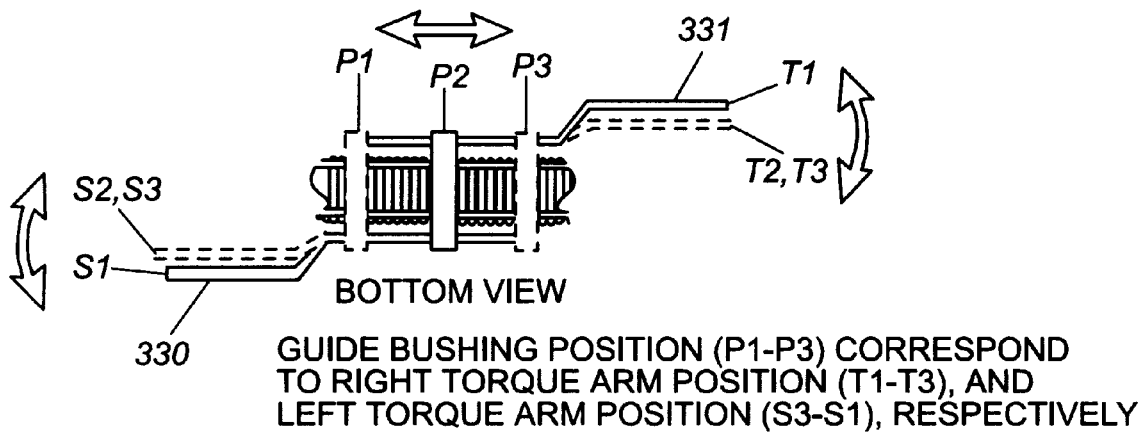

With reference to FIGS. 13D and 13E, the guide bushing 324 is illustrated in a left P1, center P2, and right P3 position. The right torque arm 331 responds to these positions by moving to position T1, T2, and T3 respectively. The left torque arm 330 moves in the opposite sense to positions S1, S2, and S3. The motion of the right torque arm 331 from T1 to T3 twists the torsional fuselage 323 counter clockwise when viewed from the front (not shown), while the motion of the left torque arm 330 from S1 to S3 twists the torsional fuselage in a clockwise direction when viewed from the front (not shown).

The frequency of the power source (such as a RCM) and the guide bushing 324 must be matched to the resonant fundamental torsional frequency of the fuselage 323 with its wings 340 and 341. Initially, the RCM will force the wings 340 and 341 by driving the torque arms 330 and 331 to twist the torsional fuselage 323. As resonant motion builds, the RCM (which will be tuned beforehand to provide input at this resonant frequency), will supply sustaining torsional forces equally and oppositely to each end of the torsional fuselage 323 through the torque arms. The torque arms 330 and 331 should be slightly flexible to allow initial preresonant sluggish motion in the torsional fuselage without binding, while allowing overshoot of the torsional fuselage after it becomes excited resonantly.

Figure 14A:
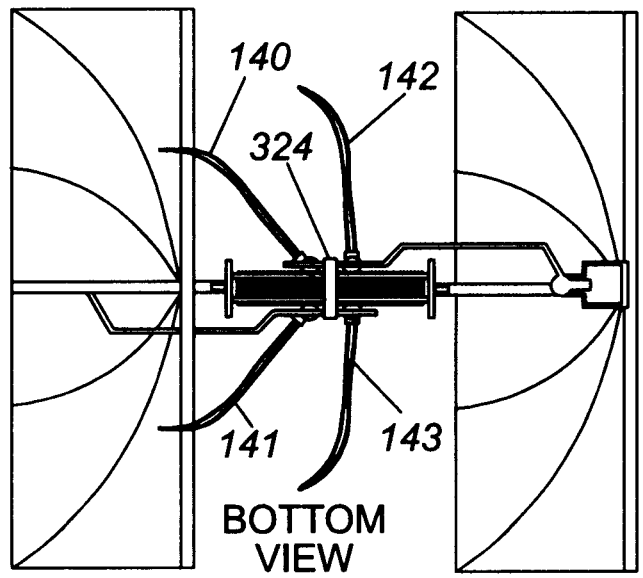
FIGS. 14A–14B are schematic diagrams illustrating a first embodiment of an entomopter configuration having legs, and a mechanical linkage structure for using the entomopter's flapping mechanism to drive the legs when the entomopter is not in flight.
Figure 14A:
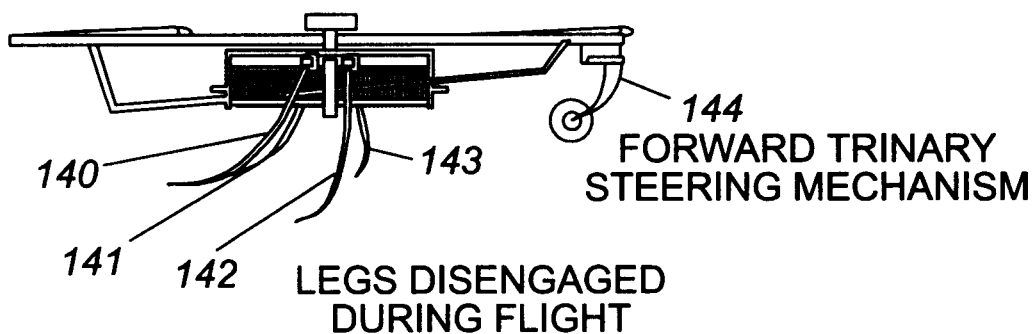

FIG. 14A shows one embodiment of how entomopter legs can be driven by the RCM. The number of legs may range from none (flight only) to many (analogous to a millipede). The particular embodiment of FIG. 14 is an entomopter having four legs 140–143 with a trinary steering mechanism 144. The entomopter may be driven by onboard intelligence, a remote human or machine pilot, or autonomously based on homing sensors that seek to direct the entomopter toward some attractant.

Figure 14B:
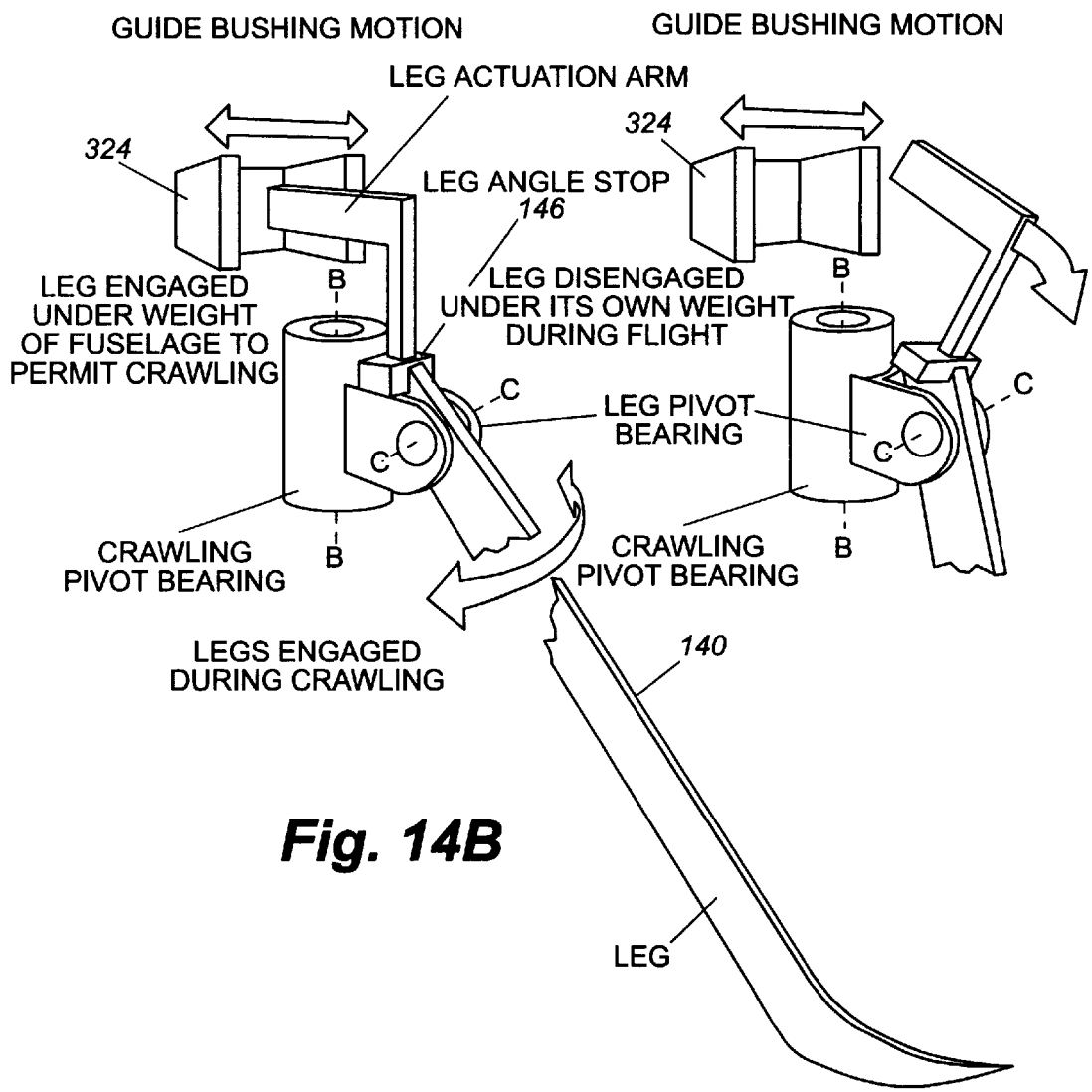

FIG. 14B illustrates a mechanical linkage for driving one the legs 140. Similar linkages (not shown) are used to drive the other legs. The reciprocating element (guide bushing) 324 causes leg 140 to pivot about the B—B axis. The shape of the leg is such that it will engage the ground with high friction when moving in one direction, but will slide easily over the ground when moving in the opposite direction. The leg 140 remains engaged with the reciprocating element (guide bushing) of the RCM as long as the entomopter is on the ground. The weight of the entomopter forces the leg 140 to pivot up about the C—C axis. This pivot motion is limited by the leg angle stop 146. Once airborne, the entomopter's RCM operates at much higher reciprocation frequencies than necessary for crawling. Were the legs to remain engaged, they would flail in the air and waste energy through the acceleration and deceleration of their mass. As soon as the entomopter leaves the ground, the weight of the leg 140 causes it to rotate down about the C—C axis, effectively disengaging the leg 140 from the guide bushing 324. Upon landing, the weight of the entomopter causes the leg 140 to rotate up along the C—C axis and reengage the guide bushing 324. In practice, reciprocation speeds for crawling are on the order of 1 Hz or less, whereas flight speeds are in excess of 10 Hz, and typically on the order of 20 Hz for a 50 gram entomopter.

Figure 15A:
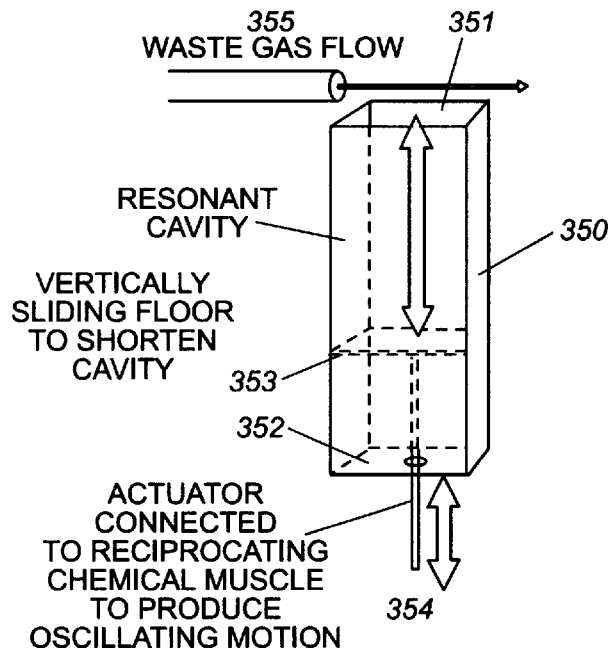
FIG. 15A is a schematic diagram illustrating an embodiment of an entomopter structure for using waste gas and wing motion to produce ultrasonic sound.
Figure 15B:
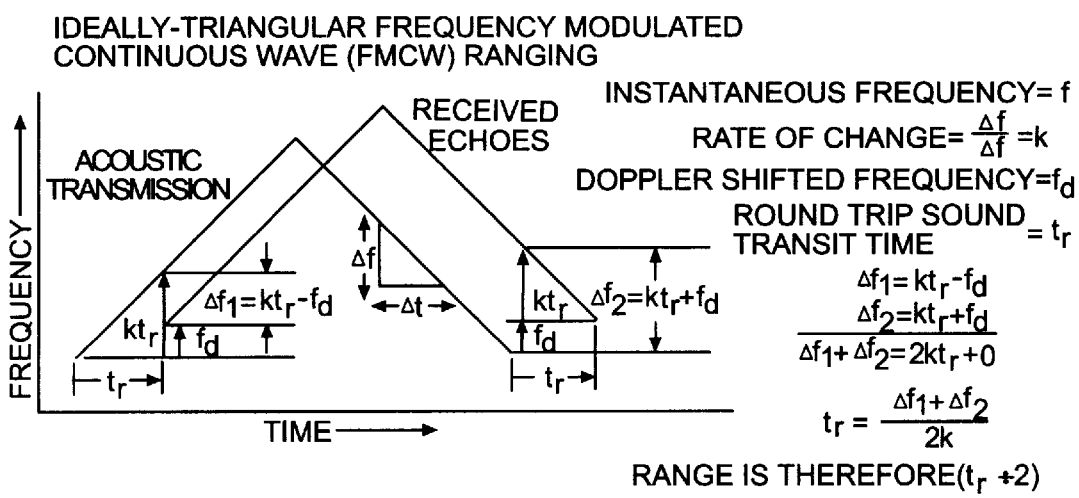
FIG. 15B is a graphic diagram illustrating how the ultrasonic sound produced by the structure of FIG. 15A is used by the entomopter to sense altitude and environmental obstacles such as walls by frequency modulated continuous wave (FMCW) ranging.

FIGS. 15A and 15B illustrates an optional feature of the entomopter that uses waste gas from the RCM together with wing motion to sense altitude as well as environmental obstacles such as walls. In FIG. 15A, a round or rectangular tube 350 is mounted on the entomopter. The tube 350 is a hollow cavity having an open end 351 and a closed end 352. A sliding base 353 is mounted in the cavity. The base 353 may be moved between the open end 351 and the closed end 352 along the central axis 354 of the cavity, thereby changing the length of the cavity. Waste gas 355 from the RCM is directed perpendicularly to the open end 351 of the tube 350. Gas passing over the open end of the tube sets up standing acoustic waves that add resonantly to produce one or more tones depending on the modes that are excited. Cavities with flat sides can produce higher energy resonances at certain frequencies due to the interaction of the side wall resonances and the primary cavity (depth) resonanace. In either case, the frequency modulated continuous wave (FMCW) waveform generated consists of discrete frequencies based on a set of eigenvalues determined by the geometry of the resonant cavity for a given slide position. If the sliding base of the tube is connected to the RCM guide bushing, then the frequency produced by allowing waste gas to blow over the opening of the tube will approximate the motion of the RCM in that it will produce acoustic frequencies that cyclically rise and fall in frequency. If the tube is sized appropriately for the waste gas stream, ultrasonic frequencies will result. This is desirable in order to focus a narrow beam of acoustic energy in a particular direction.

Given that an ultrasonic acoustic beam can be directed at an obstacle or at the floor (for altimetry), the range or altitude can be measured by taking advantage of the fact that the frequency of this beam is modulated cyclically at the rate of RCM motion. The cyclical motion can be sinusoidal, stepped, triangular, sawtooth, or otherwise configured, and the following explanation remains valid in principal. FIG. 15B depicts a triangular wave form, implying that the RCM is producing linear motion in both directions, and is saturating in that it abruptly reaches a physical limit at either end. In practice, it will be better to operate the RCM with a more sinusoidal pattern, but for the purpose of this explanation, a triangular waveform provides a more straight forward explanation of the principal.

As the RCM oscillates back and forth, it is linked not only to the wings and legs, but also to the sliding base of the resonant acoustic cavity (shown in FIG. 15A to be rectangular). As waste gas is allowed to flow over the top of the tube, a resonance is set up which produces an acoustic emission that is proportional in frequency to the depth of the cavity at any given moment. This acoustic emission of varying frequency will propagate away from the RCM and any focusing element contained on the entomopter until it encounters an obstacle. Were this emission to be focused downward so as to be used as an altimeter, the emission would encounter the floor and would bounce back. Some portion of the energy that is not absorbed by the air and floor, or that is not lost due to 1/(range)$^2$ spreading, will return to the entomopter where an electronic microphone will register its presence.

The return echo will have the same frequency modulation shape as that which was transmitted, but it will be shifted in time (delayed) by an amount proportional to the total distance that the acoustic emission had to travel. The range to the floor could then be calculated by dividing the round trip delay from transmission to reception by two, and multiplying this time by the speed of propagation of the sound waves. One problem occurs when this calculation is being made for a moving platform such as the entomopter. A Doppler frequency shift is impressed upon the signal by virtue of the fact that there is relative motion between the vehicle and the reflecting obstacle. For approaching obstacles, this frequency shift will increase all returned frequencies. For retreating obstacles, all frequencies will be decreased. FIG. 15B shows the approaching case in which the received echo frequencies are shifted upward as well as delayed. The Doppler shift can be resolved by measuring the difference in the received and transmitted frequencies on an instantaneous basis, and dividing by an amount proportional to the rate of change of the frequency modulation induced by the changing cavity length in response to the RCM motion.

Of unique value, is the fact that waste products (in the form of vented gas) from the RCM can be used with little added energy penalty to perform altimetry and sensing for obstacle avoidance. The modulation of the frequency for the FMCW emission is an artifact of the motion of the RCM. A single acoustic source such as that described above could also be multiplexed to emit in different directions by alternately focusing the acoustic energy in those different directions by means of a flat plate acoustic mirror (not shown) or parabolic dish (not shown) that is mechanically linked to the entomopter, and moving at some submultiple of the wing beat frequency. In a different embodiment (not shown), the wings themselves could be used to direct the emitted acoustic energy at discrete points in the flapping cycle.

While specific apparatus arrangements for implementing an entomopter in accordance with the present invention are described, it should be understood that alternative apparatus arrangements are anticipated. Furthermore, it will be obvious to those skilled in the art that many variations and modifications may be made to the preferred embodiments as described above without substantially departing from the spirit and scope of the present invention. It is intended that all such variations and modifications be included within the scope of the present invention, as set forth in the following claims.

Now, therefore, the following is claimed:

1. A mobile vehicle, comprising:
   a fuselage;
   at least one pair of opposing wings pivotally coupled to said fuselage on opposing sides thereof;
   a controllable flapping means coupled to said wings for moving said wings in a flapping manner to produce lift; and
   a circulation control means for modifying the lift produced by each of said wings.

2. The vehicle of claim 1, wherein said flapping means is a reciprocating chemical muscle (RCM).

3. The vehicle of claim 2, wherein said RCM produces gas and said circulation control means comprises controllably venting said gas along the surface of said wings.

4. The vehicle of claim 1, wherein said flapping means is a power source selected from the group consisting of combustive, rheological, chemically reactive, electromotive, electrostrictive, piezoelectric, or magnetostrictive power sources.

5. The vehicle of claim 1, wherein said wings are configured to produce lift on both the upstroke and the downstroke.

6. The vehicle of claim 1, wherein said flapping means causes said wings to flap up and down autonomically.

7. The vehicle of claim 1, further comprising a sensing device configured to sense the position of the vehicle relative to a surface.

8. The vehicle of claim 7, wherein said sensing device includes an ultrasonic sound source and an ultrasonic sound receiver, said ultrasonic sound source configured to direct ultrasonic sound toward a surface, said ultrasonic sound receiver configured to detect a return echo reflected from said surface.

9. The vehicle of claim 8, wherein said flapping means is a RCM that produces waste gas and wherein said ultrasonic sound source produces ultrasonic sound from the waste gas produced by said RCM.

10. The vehicle of claim 8, wherein said ultrasonic sound source produces a frequency modulated continuous wave (FMCW) waveform.

11. The vehicle of claim 2, wherein said RCM generates electricity.

12. The vehicle of claim 1, further comprising:
    at least one pair of opposing legs pivotally coupled to said fuselage, said pair of opposing legs being capable of movement about an axis that is substantially orthogonal to the axis of movement of said pair of opposing wings; and
    a means for coupling said at least one pair of opposing legs to said flapping means.

13. A mobile vehicle, comprising:
    a fuselage;
    at least one pair of opposing wings pivotally coupled to said fuselage on opposing sides thereof;
    flapping means coupled to said at least one pair of opposing wings for moving the at least one pair of opposing wings in a flapping manner;
    at least one pair of opposing legs pivotally coupled to said fuselage, said pair of opposing legs being capable of movement about an axis that is substantially orthogonal to the axis of movement of said pair of opposing wings;
    means for coupling said at least one pair of opposing legs to said flapping means; and
    means for decoupling said at least one pair of opposing legs from said flapping means, while the vehicle is in flight.

14. The vehicle of claim 13, further comprising means for automatically decoupling said means for decoupling.

15. The vehicle of claim 14, further comprising means for automatically recoupling said at least one pair of opposing legs to said flapping means, when the vehicle is on the ground.

16. A mobile vehicle, comprising:
    a fuselage;
    a first wing, said first wing being pivotally coupled to said fuselage near the center of said first wing;
    a second wing, said second wing being pivotally coupled to said fuselage near the center of said second wing, said second wing being capable of movement about a common axis with said first wing;

a flapping means coupled to both said first wing and said second wing for reciprocating the first and second wing; and circulation control means for modifying the lift produced by each of said wings.

17. The vehicle of claim 16, further comprising:

at least one pair of opposing legs pivotally coupled to said fuselage, said pair of opposing legs being capable of movement about an axis that is substantially orthogonal to the axis of movement of said first wing and said second wing; and a means for coupling said at least one pair of opposing legs to said flapping means.

18. The vehicle of claim 16, wherein said flapping means is a reciprocating chemical muscle (RCM).

19. The vehicle of claim 16, wherein said wings are configured to produce lift on both the upstroke and the downstroke.

20. The vehicle of claim 16, wherein said fuselage is a torsional fuselage.

21. The vehicle of claim 20, wherein said wings and said torsional fuselage comprise an integrated resonant structure.

22. The vehicle of claim 21, wherein said flapping means reciprocates said wings at the resonant frequency of said integrated resonant structure.

23. A method for operating a mobile vehicle, said vehicle having a fuselage and at least one pair of wings, the method comprising the steps of:

providing a source of reciprocating power;

coupling said wings to said source of reciprocating power;

reciprocating said wings in a flapping manner to produce lift; and applying circulation control to modify the lift produced by each of said wings.

24. The method of claim 23, wherein said fuselage and said wings form an integrated resonant structure, and wherein said reciprocating step further comprises reciprocating said wings at the resonant frequency of said resonant structure.

25. The method of claim 23, wherein said applying step further comprises steering said vehicle by controllably modifying the lift produced by each of said wings.

26. The method of claim 23, further comprising the step of sensing a position of the vehicle relative to a surface.

27. The method of claim 26, wherein said sensing step further comprises directing an ultrasonic sound toward the surface, and detecting a return echo reflected from the surface.

28. The method of claim 27, wherein said ultrasonic sound is a frequency modulated continuous wave (FMCW) waveform.

29. A method for operating a mobile vehicle having at least one pair of wings and at least one pair of legs, said method comprising the steps of:

providing a source of reciprocating power;

coupling said wings to the source of reciprocating power, said wings being configured to produce lift;

coupling said legs to the source of reciprocating power, said legs being configured to engage a surface and move in a first direction such that said vehicle is urged in a direction of travel along the surface; and decoupling the legs from the source of reciprocating power when the vehicle is in flight.

* * * * *